US011953889B2

(12) United States Patent
Hawthorne et al.

(10) Patent No.: US 11,953,889 B2
(45) Date of Patent: Apr. 9, 2024

(54) ADAPTING DATA MODELS FOR DATA COMMUNICATION TO EXTERNAL PLATFORMS

(71) Applicant: Rockwell Automation Technologies, Inc., Mayfield Heights, OH (US)

(72) Inventors: Dale A. Hawthorne, Rocky River, OH (US); Stephen C. Briant, Moon Township, PA (US); Nicholas J. Marangoni, Peninsula, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 519 days.

(21) Appl. No.: 17/313,670

(22) Filed: May 6, 2021

(65) Prior Publication Data

US 2021/0349448 A1 Nov. 11, 2021

Related U.S. Application Data

(60) Provisional application No. 63/022,213, filed on May 8, 2020.

(51) Int. Cl.
*G06F 16/28* (2019.01)
*G05B 19/418* (2006.01)
*G06F 16/22* (2019.01)

(52) U.S. Cl.
CPC ..... *G05B 19/4185* (2013.01); *G05B 19/4183* (2013.01); *G06F 16/2282* (2019.01); *G06F 16/284* (2019.01)

(58) Field of Classification Search
None
See application file for complete search history.

(56) References Cited

U.S. PATENT DOCUMENTS

| 2006/0259154 A1 | 11/2006 | Hood et al. |
| 2007/0112447 A1 | 5/2007 | McGreevy et al. |
| 2013/0211559 A1 | 8/2013 | Lawson et al. |

FOREIGN PATENT DOCUMENTS

EP 2942682 A1 11/2015

OTHER PUBLICATIONS

U.S. Appl. No. 17/010,743, filed Sep. 2, 2020, Stephen C. Briant.
(Continued)

*Primary Examiner* — Craig C Dorais
(74) *Attorney, Agent, or Firm* — Fletcher Yoder, P.C.

(57) ABSTRACT

An adapter of a common gateway platform associated with an industrial automation system is described for communicating data acquired from various devices using a data model of the common gateway platform with external components using various data models. The computing device may determine a relationship between datasets of the native data model and datasets of an external component based on obtaining an application programming interface (API) and/or software development kit (SDK) of the external component. Accordingly, the adapter may enable the common gateway platform to interact with the external component by providing functionalities of the external component as native functions of the computing device. That is, the adapter may provide functions to connect, create, read, write, update, delete, run commands and queries, and disconnect from the external component using native commands and actions of the common gateway platform.

17 Claims, 14 Drawing Sheets

(56) References Cited

OTHER PUBLICATIONS

European Search Report EP for Application No. 21173040.3, dated Jan. 23, 2023 (9 pages).
European Search Report EP Application No. 21173040.3, dated Oct. 1, 2021 (11 pages).

ADAPTING DATA MODELS FOR DATA COMMUNICATION TO EXTERNAL PLATFORMS

CROSS REFERENCE TO RELATED APPLICATIONS

This application claims benefit of U.S. Provisional Patent Application No. 63/022,213, entitled "External Platform Adapter for a Common Gateway Platform," filed on May 8, 2020, and which is herein incorporated by reference in its entirety for all purposes.

BACKGROUND

The present disclosure relates generally to systems and methods for collecting context of data stored on industrial automation components, such as controllers, devices, and the like. In particular, the present disclosure is related to systems and methods for employing an information gateway component that may move data along with values associated with the data when data is requested from a component.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An industrial automation system may include an industrial automation layer including a number of industrial automation components. The industrial automation components may include a wide range of components, such as valves, electric motors, a wide range of sensors, other suitable monitoring devices, or the like. The industrial automation components may provide data indicative of information or status therefrom. Moreover, the industrial automation components may include programming terminals, automation controllers, input/output (I/O) modules, communication networks, human-machine interface (HMI) terminals, and the like, to receive statuses and/or information in the form of data. The industrial automation system may provide the received statuses and/or information in various informative formats to an operator, such as alerts to change or adjust operation of one or more components of the industrial automation system or adjusting operation of one or more actuators, to manage the industrial automation system, or the like.

Generally, the networked components described above may be associated with information, such as different statuses, sensing data, or the like. The information may relate to an operation of the industrial automation system and may be monitored by one or more automation control and monitoring systems. Certain communication systems are used to transmit the information to an automation control and monitoring system of the industrial automation system. For example, each networked device may communicate with one or more automation control and monitoring systems via wired or wireless communication networks. With this in mind, it may be useful to improve methods for communication between automation control and monitoring systems and networked devices within industrial automation systems.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a tangible, non-transitory, machine-readable medium, comprising machine-readable instructions that, when executed by a processor, cause the processor of an industrial automation system to perform actions. The actions may include receiving a request to transmit a first dataset to an external component communicatively coupled to the processor, determining a first data structure of the first dataset based on an information model associated with the first dataset, detecting a second data structure of one or more datasets associated with the external component, and determining a relationship between the first data structure and the second data structure. The actions may further include converting the first dataset into a second dataset structured according to the second data structure based on the relationship and transmitting the second dataset to the external component.

In another embodiment, an industrial automation system is described. The industrial automation system may include multiple devices for performing multiple operations. Moreover, one or multiple processors may perform operations. The operations may include receiving a request to transmit a first dataset to an external component communicatively coupled to the processor, determining a first data structure of the first dataset based on an information model associated with the first dataset, detecting a second data structure of one or more datasets associated with the external component, and determining a relationship between the first data structure and the second data structure. The operations may further include converting the first dataset into a second dataset structured according to the second data structure based on the relationship and transmitting the second dataset to the external component.

In yet another embodiment, a method of operating an industrial automation system is described. The method may include using a computing device to perform operations that includes receiving a request to transmit a first dataset to an external component communicatively coupled to the computing device, determining a first data structure of the first dataset based on an information model associated with the first dataset, detecting a second data structure of one or more datasets associated with the external component, and determining a relationship between the first data structure and the second data structure. The method may further include converting the first dataset into a second dataset structured according to the second data structure based on the relationship and transmitting the second dataset to the external component.

DRAWINGS

These and other features, aspects, and advantages of the embodiments described in the present disclosure will become better understood when the following detailed description is read with reference to the accompanying drawings in which like characters represent like parts throughout the drawings, wherein.

Figure 1:
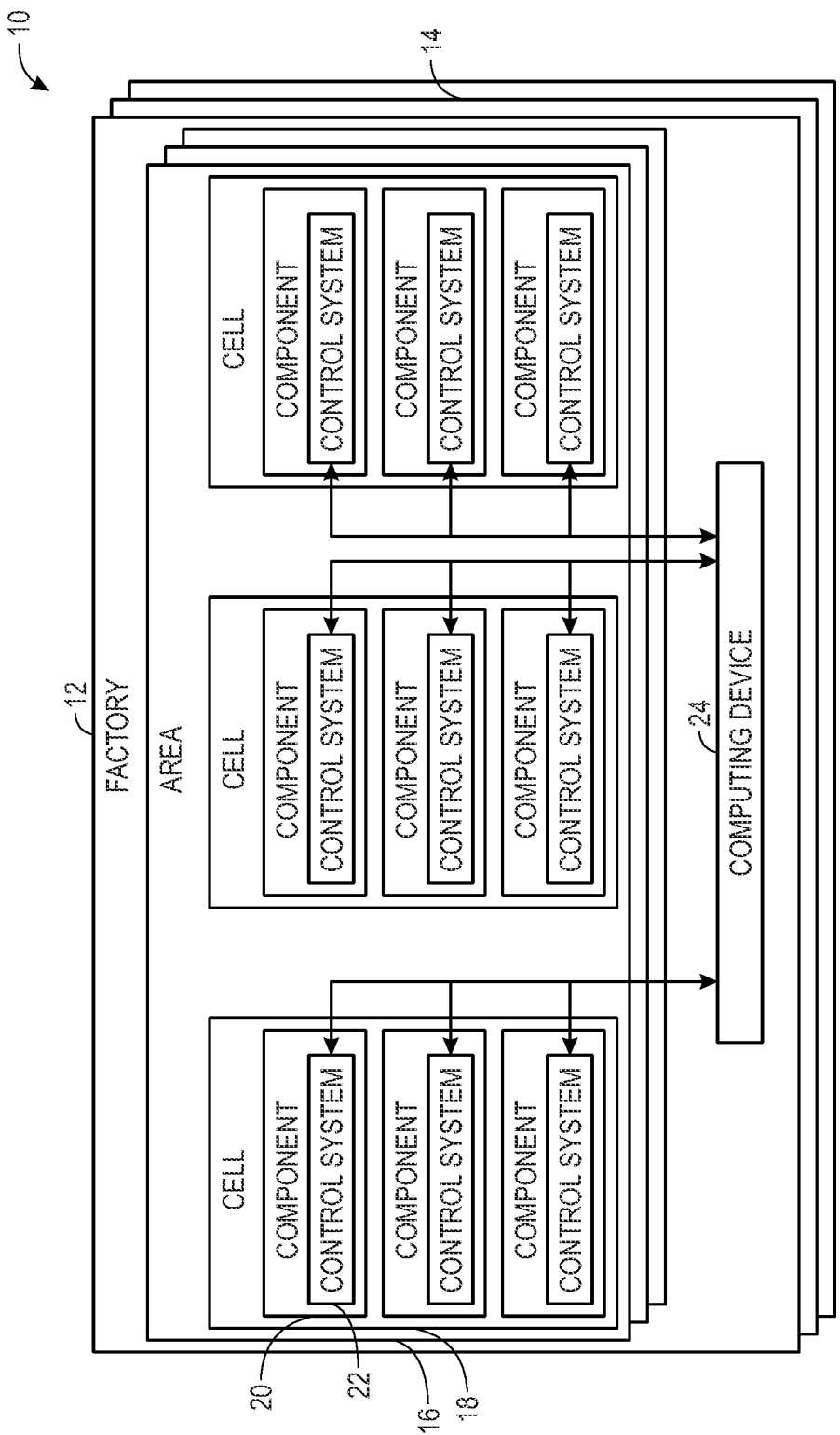
FIG. 1 illustrates a block diagram representing example hierarchical levels of an industrial automation system, in accordance with an embodiment presented herein.
Figure 14:
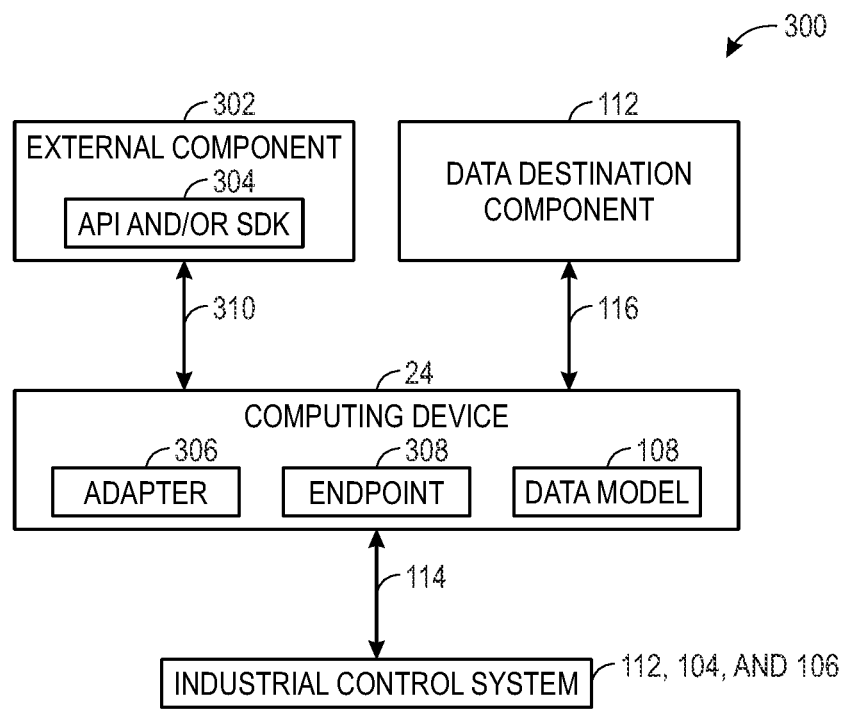
Figure 15:
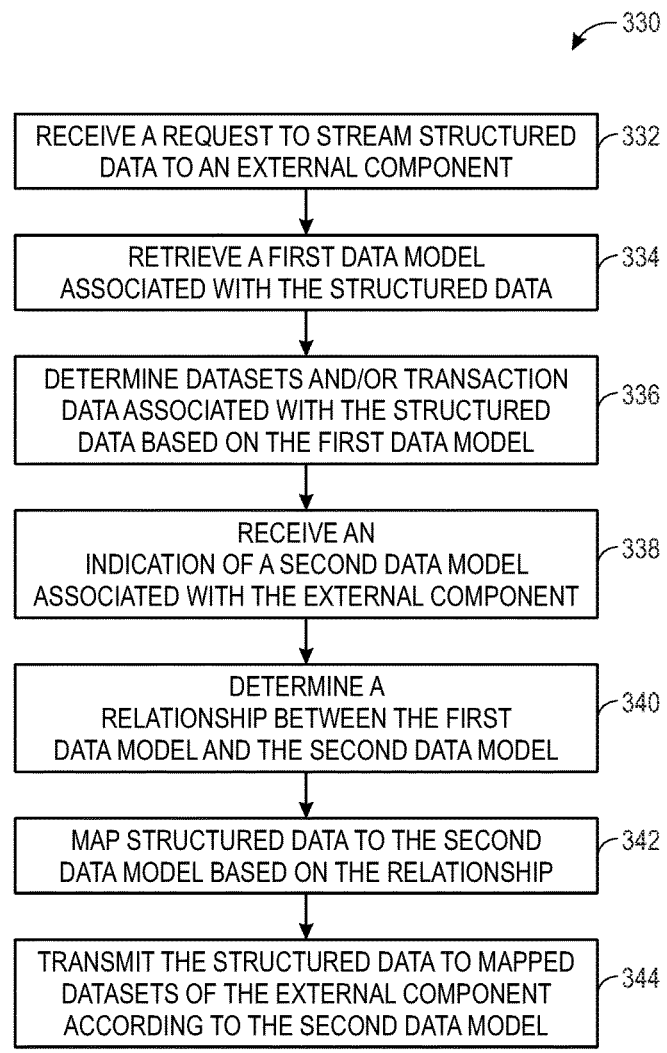

FIG. 14 illustrates a block diagram indicative of relationships between the computing device and control systems that may be employed within the industrial automation system of FIG. 1 and an external component using a different data structure, in accordance with an embodiment presented herein; and FIG. 15 illustrates a flowchart of a method for transmitting data organized according to a data model to an external component employing a different data model, in accordance with an embodiment presented herein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The present disclosure relates generally to systems and methods for collecting data and context of data stored on industrial automation components, such as controllers, devices, and the like. Data models may be used to detail a relationship between certain, constraints, rules, data, data values, operations, or other types of information. The data models may specify relationships between kinds or types of data with respect to other types of data. As such, the data models may provide context with regard to how certain datasets are related to other datasets. As a result, a stable and organized structure of information may be provided to different software platforms, devices, and the like. By way of example, in an industrial automation system that employs operational technology (OT) systems and information technology (IT) systems, data communicated between the OT systems and the IT systems may not include the context (e.g., properties) of the data when the data is transmitted. Instead, raw values of the data may be transmitted without providing the appropriate context regarding the data.

With this mind, the embodiments described herein may include a component, such as a computing device, that may collect and preserve the context of the data acquired from various devices, such that the computing device may transmit the acquired data along with the context of the data. For example, if a data model defines a dataset A as including datasets B and C, the computing device may acquire dataset B along with dataset C when facilitating a request for dataset A. In certain embodiments, the data model may provide a context with regard to related datasets. The data model may be defined with respect to the datasets as SmartTags (e.g., metadata) or another suitable data structure capable of detailing the relationships between datasets in the data model. By providing the data model with retrieved datasets, the computing device may provide contextual information regarding relationships between various devices and components in the industrial automation system and enable a coherent data transfer between devices.

In addition to retrieving datasets with specific data structures related to the respective data model, the computing device may provide a user interface that enables a user to provide the context or information model associated with a particular dataset. In this way, the user may add a data model or context to datasets, such that the retrieved data may continue to be transmitted to other devices with the appropriate context.

By providing data with its context, different software platforms may synthesize or analyze the retrieved data more efficiently. For instance, unstructured component data provided without context may be pre-processed to group relevant datasets together prior to the datasets being analyzed. Moreover, by retrieving the datasets with the appropriate context, the computing device may acquire datasets and display how the datasets are related via a particular context.

In addition to retrieving datasets with SmartTags and/or other data structures related to the respective data model, the computing device may provide a user interface for a user to input transition conditions or transaction conditions to define a workflow for transferring the datasets using the context and/or data model associated with one or more datasets. For instance, the user may describe a workflow using the SmartTags and the transaction conditions to control the transition of data between a data generating component of the industrial automation system and a data destination component. For example, the user may describe a transaction condition by defining a triggering event (e.g., when data value exceeds 300) for data retrieved from a first data source (e.g., a temperature sensor) to initiate capturing data from a second data source (e.g., pressure sensor). In addition, the transaction conditions may define how data will be collected from a data source. That is, the transaction conditions may detail that data is accessed from a data source using a particular driver and collection path. In this way, the present embodiments described below better enable the user to describe different datasets, associate a dataset to one or more other datasets by defining a relationship between the respective datasets, define transaction conditions to detail a custom workflow for data communication through an industrial automation system using the data model described herein. Additional details with regard to providing context with datasets and defining the manner in which the datasets are retrieved from a source and sent to a destination will be described below with reference to FIGS. 1-13.

By way of introduction, FIG. 1 depicts a block diagram embodiment of an example industrial automation system 10 in which the present embodiments may be implemented. The industrial automation system 10 may be any system in the material handling, packaging industries, manufacturing, processing, batch processing, or any technical field that employs the use of one or more industrial automation components. In one embodiment, the industrial automation system 10 may include a factory 12 that may encompass part of the entire industrial automation system 10. As such, the industrial automation system 10 may include other factories 14 that may be employed with the factory 12 to perform an industrial automation process or the like.

Each factory 12 (or factory 14) may be divided into a number of areas 16, which may include different production processes that use different types of industrial automation components. In one example, one area 16 may include a sub-assembly production process and another area 16 may include a core production process. In another example, each area 16 may be related to a different operation being performed in the manufacturing process. For instance, in a jellybean manufacturing system, the areas 16 may include a jelly bean making area, a packaging area, a water filtration area, and the like. In yet another example, the area 16 may include a production line in which a particular industrial process may be performed. Referring back to the jellybean manufacturing system example, the production line may include a cooking line in which the jelly beans may be created, a sorting line where the jelly beans may be sorted according to a respective flavor, and a packaging line where the sorted jelly beans may be packaged into boxes or the like.

The area 16 may also be associated with physical locations of a number of industrial automation components 20, referred hereinafter as components 20. The components 20 may include a wide range of valves, electric motors, a wide range of sensors, other suitable monitoring devices, or the like. The areas 16 may also be related to different discipline areas of the industrial automation system 10, such as batch operation areas, continuous operation areas, discrete operation areas, inventory operation areas, and the like.

The areas 16 may be subdivided into smaller units, or cells 18, which may be further subdivided into components 20. Using the example described above, the sub-assembly production process area 16 may be subdivided into cells 18 that may denote a particular group of components 20 that may be used to perform one aspect of the sub-assembly production process. As such, the cell 18 may include a portion of the area 16 such as first part of a production line. The cell 18 may also include different parts of a particular procedure.

These cells 18 may then be further subdivided into components 20, which may correspond to individual industrial automation components, such as controllers, input/output (I/O) modules, motor control centers, motors, human machine interfaces (HMIs), operator interfaces, contactors, starters, sensors, drives, relays, protection devices, switchgear, compressors, network switches (e.g., Ethernet switches, modular-managed, fixed-managed, service-router, industrial, unmanaged, etc.) and the like. Although the factory 12, the factory 14, the areas 16, and the cells 18 are termed as factories, areas, and cells, it should be noted that in various industries these groupings may be termed differently.

The components 20 may also be related to various industrial equipment such as mixers, machine conveyors, tanks, skids, specialized original equipment manufacturer machines, and the like. The components 20 may also be associated with devices used by the equipment such as scanners, gauges, valves, flow meters, and the like. In one embodiment, every aspect of the component 20 may be controlled or operated by a single controller (e.g., control system). In another embodiment, the control and operation of each aspect of the component 20 may be distributed via multiple controllers (e.g., control system).

The components 20 may be used within the corresponding cell 18, area 16, and/or factory 12 to perform various operations for the respective cell 18, area 16, and/or factory 12. In certain embodiments, the components 20 may be communicatively coupled to each other, to an industrial control system 22, or the like. In some embodiments, components 20 may include routers, switching gateways, and other common devices that may facilitate the communicatively coupling of the components 20. Additionally, the industrial control system 22, referred hereinafter as the control system 22, may also be communicatively coupled to one or more sub-systems that may monitor and/or control the operations of each respective cell 18, area 16, or factory 12.

In one embodiment, the control system 22 may include a computation device that may include communication abilities, processing abilities, and the like. For example, the control system 22 may be a controller, such as a programmable logic controller (PLC), a programmable automation controller (PAC), or any other controller that may monitor, control, and operate an industrial automation component 20. In other embodiments, the control system 22 may be incorporated into one or more components 20 (e.g., edge computation devices) or may be implemented as a stand-alone computation device (e.g., general purpose computer), such as a desktop computer, a laptop computer, a tablet computer, a mobile device computing device, or the like.

In certain embodiments, the control system 22 may be implemented within devices and enable components 20 to connect and communicate with each other. For instance, the control system 22 may be implemented within network routers and/or switches. In this manner, the network routers and/or switches may host the control system 22 to control and operate the components 20 and may be communicatively coupled to a respective network router and/or switch. Since network routers and/or switches may serve as a hub for data transfers between the components 20, the control system 22 embedded within the routers and/or switches may be strategically positioned within a data network to have access or receive data associated with various components 20. As such, the control system 22 may perform various types of analyses on the received data and may then control and operate the respective components 20 more efficiently or effectively based on the results of the analysis.

In addition to the physical devices mentioned above, the control system 22 may include a software-based emulation of any of the aforementioned physical devices. For example, the control system 22 may be implemented as software modules that may perform similar operations as certain hardware controllers, devices, and the like. As such, the control system 22 may create virtual instances of the hardware components (e.g., controllers, I/O modules). These virtual instances may provide more flexible ways in which the control system 22 may be implemented to monitor and control the components 20.

In one embodiment, the control system 22 may be implemented virtually in a cloud-accessible platform (i.e., cloud-computing system), one or more servers, in various computing devices (e.g., general purpose computers), and the like. As such, the control system 22 may operate as a soft controller or as a control engine running in the cloud-computing system. By virtually implementing the control system 22 in a cloud-computing system, the control system 22 may use a distributed computing architecture to perform various analyses and control operations. As more data associated with the components 20, the cells 18, the areas 16, and the factories 14 become available, the distributed computing architecture in the cloud-computing system may enable the control system 22 to provide data analysis more efficiently. That is, since the cloud-computing system may incorporate numerous computing systems and processors to perform the data analysis, the results of the analysis may be available more quickly. In this way, the respective operations of the components 20, the cells 18, the areas 16, and the factories 14 may be controlled in real-time or near real-time.

Keeping the foregoing in mind, it should be understood that the control system 22, as mentioned throughout this disclosure, may be implemented as physical components (e.g., hardware-based) and/or virtual components (e.g., software-based) used to monitor and/or operate the components 20, the cells 18, the areas 16, and the factories 14. Moreover, by providing the ability to incorporate the control system 22 into various types of environments, the industrial automation system 10 may be well suited to expand and grow with the addition of new components 20.

In certain embodiments, a computing device 24 may be connected to one or multiple control systems, such as the control system 22. The computing device 24 may receive data from the one or multiple control systems associated with the respective components 20. The computing device 24 may provide structure to the received data, for example by allocating the received data to datasets according to a data model. The computing device 24 may use data models to provide context to the received data from the control system 22. In some embodiments, the computing device 24 may receive data from components 20 between multiple cells 18, multiple areas 16, and/or different factories 12 and/or 14. The computing device 24 described herein may be referred to as the information gateway, gateway, edge computing device, or by other names in different embodiments.

In some embodiments, the computing device 24 may be implemented into different physical devices, such as control system 22 and/or component 20, network routers and/or switches, or a stand-alone computing device (e.g., general purpose computer), such as a desktop computer, a laptop computer, a tablet computer, a mobile device computing device, or the like. In other embodiments, the computing device 24 may be implemented as a controller, such as a programmable logic controller (PLC), a programmable automation controller (PAC), or any other controller that may monitor, control, and operate an industrial automation device or component. Additionally, the computing device 24 may include a software-based emulation of any of the aforementioned physical devices.

Figure 2:
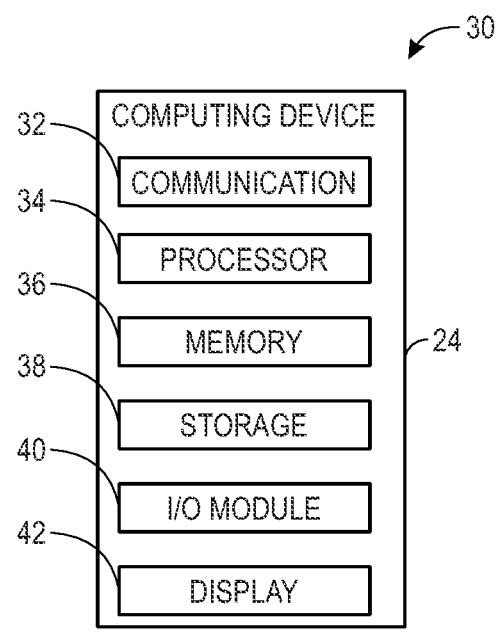
FIG. 2 illustrates a block diagram of components within a computing device of the industrial automation system of FIG. 1, in accordance with an embodiment presented herein.

As mentioned above, the computing device 24 may be a controller or any computing device that may include communication abilities, processing abilities, and the like. FIG. 2 illustrates a detailed block diagram 30 of components in the computing device 24 that may be used to perform the techniques described herein.

Referring now to FIG. 2, the computing device 24 may include a communication component 32, a processor 34, a memory 36, a storage 38, input/output (I/O) module 40 including I/O ports, a display 42, and the like. The communication component 32 may be a wireless or wired component that may facilitate communication between the components 20, the control system 22 of the cell 18, the area 16, the factory 12 or factory 14, and the like.

The communication component 32 may be a wireless or wired communication component that facilitates communication between the computing device 24 and other suitable electronic devices. The processor 34 may be any type of computer processor or microprocessor capable of executing computer-executable code. The processor 34 may also include multiple processors that may perform the operations described below.

The memory 36 and the storage 38 may be any suitable articles of manufacture that can serve as media to store processor-executable code, data, or the like. These articles of manufacture may represent computer-readable media (i.e., any suitable form of memory or storage) that may store the processor-executable code used by the processor 34 to perform the presently disclosed techniques. In some embodiments, the memory 36 may include a volatile data storage unit, such as a random-access memory (RAM) and the storage 38 may include a non-volatile data storage unit, such as a hard disk. The memory 36 and the storage 38 may also be used to store the data, data model, and the like. The memory 36 and the storage 38 may represent non-transitory computer-readable media (i.e., any suitable form of memory or storage) that may store the processor-executable code used by the processor 34 to perform various techniques described herein. It should be noted that non-transitory merely indicates that the media is tangible and not a signal.

The computing device 24 may also include an input/output (I/O) module 40. The I/O module 40 may enable the computing device 24 to communicate with various devices in the industrial automation system. Moreover, the I/O module 40 may enable the computing device 24 to receive data from the control system 22 and/or other control systems. The I/O module 40 may be interfaces that may couple to other peripheral components such as input devices (e.g., keyboard, mouse), sensors, input/output (I/O) modules, and the like.

The display 42 may operate to depict visualizations associated with software or executable code being processed by the processor. In one embodiment, the display may be a touch display capable of receiving inputs from a user. For example, the display 42 may be any suitable type of display, such as a liquid crystal display (LCD), plasma display, or an organic light emitting diode (OLED) display. Additionally, in one embodiment, the display 42 may be provided in conjunction with a touch-sensitive mechanism (e.g., a touch screen) that may function as part of a control interface. The display 42 may provide a user with information about the data received via the communication component 32. The information may include data received from control system 22 or other control systems and may be associated with various components. The display 42 may also be used by a user to provide input to the computing device 24, such as defining data models with the respective data structures querying for certain data to be collected from various components of the factory 12 among other things.

It should be noted that the components described above with regard to the computing device 24 are by way of example and the computing device 24 may include additional or fewer components as shown. Although the block diagram 30 is depicted with respect to the computing device 24, it should be noted that the computing device 24 may be associated with any suitable computing system described herein. It also should be noted that, the computing device 24 or other suitable components may include all or some of the described components to perform the various techniques described herein.

Figure 3:
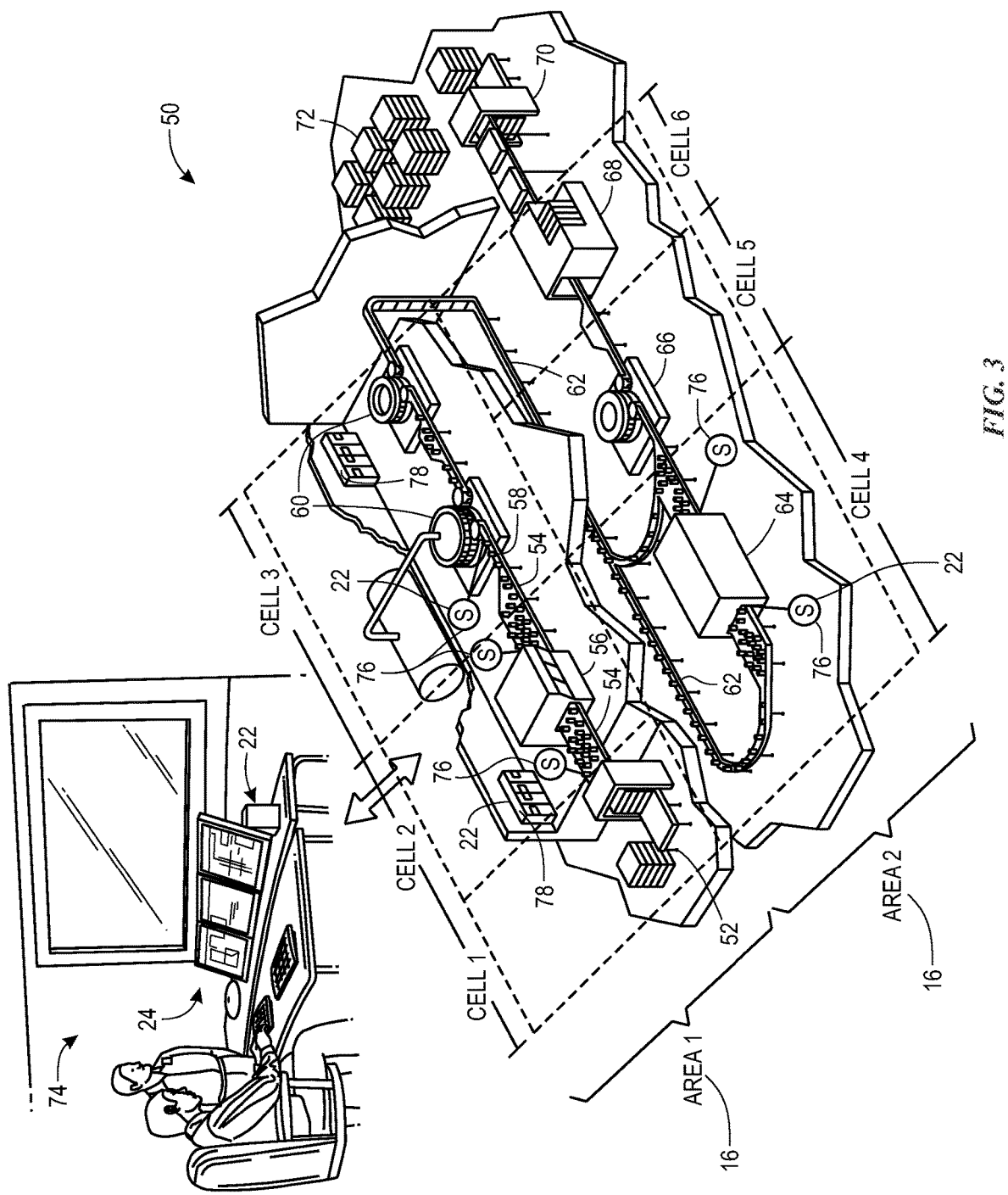
FIG. 3 illustrates an example packaging factory employing the industrial automation system of FIG. 1, in accordance with an embodiment presented herein.

An example industrial automation system 10 of a packaging factory 50 and how the packaging factory 50 may be divided and sub-divided into areas 16 and cells 18 are depicted in FIG. 3. As illustrated in FIG. 3, the packaging factory 50 may represent an exemplary high-speed packaging line that may be employed in the food and beverage industry that may process beverage containers (i.e., a beverage line). As such, the packaging factory 50 may include industrial automation components that, for example, may enable machine components to fill, label, package, or palletize containers. The packaging factory 50 may also include one or more conveyor sections that may transport, align, or buffer containers between the machine components. Although FIG. 3 illustrates a packaging factory, it should be noted that the embodiments described herein are not limited for use with a packaging factory. Instead, it should be understood that the embodiments described herein may be employed in any industrial automation environment.

As illustrated in FIG. 3, the packaging factory 50 may include machine components configured to conduct a particular function with respect to the beverage packaging process. For example, the beverage packaging process begins at a loading station 52, where pallets of empty cans or bottles to be filled are fed into packaging factory 50 via a conveyor section 54. The conveyor section 54 transports the empty cans from the loading station 52 to a washing station 56, where the empty cans and bottles are washed and prepared for filling. As the washed cans and bottles exit the washing station 56, the conveyor section 54 may gradually transition into an aligning conveyor section 58, such that the washed cans and bottles enter a filling and sealing station 60 in a single-file line.

The filling and sealing station 60 may function at an optimal rate when the washed cans and bottles enter the filling and sealing station 60 in a steady, uniform stream. However, if the transition between the conveyor section 54 and the aligning conveyor section 56 is erratic or faster than desired, the filling and sealing station 60 may not function at an optimal rate. As such, optimizing performance parameters (e.g., speed, size, function, position/arrangement or quantity) of the conveyor sections (i.e., conveyor section 54 or aligning conveyor section 58) may be beneficial to the efficiency of the packaging factory 50.

As the sealed cans exit the filling and sealing station 60, a buffering conveyor section 62 may hold the sealed cans to delay their entry into the next station. In addition, the buffering conveyor section 62 may transport the sealed cans in a single-file line so that the sealed cans arrive at a sterilization station 64 or a labeling station 66 at a desired time with the desired quantity of cans. Similar to the filling and sealing station 60, the packaging station 64 or the labeling station 66 functions efficiently when the buffering conveyor section 62 operates at optimal performance parameters (e.g., optimal speed, size, function, position/arrangement or quantity). After the cans and bottles have been sterilized and/or labeled, they are packaged into cases (e.g., 6-pack, 24-pack, etc.) at a packaging station 68, before they are palletized for transport at station 70 or stored in a warehouse 72. Clearly, for other applications, the particular system components, the conveyors and their function will be different and specially adapted to the application.

The packaging factory 50 may also include the computing device 24 and the control system 22, which may be located in a control room 74, distributed onto one or more sensors 76, and/or the like. The control system 22 may be coupled to the one or more sensors 76, which may monitor various aspects of the machine components or conveyor sections of the packaging factory 50. The sensors 76 may include any type of sensor, such as a pressure sensor, an accelerometer, a heat sensor, a motion sensor, a voltage sensor, and the like. The sensors 76 may be located in various positions within the packaging factory 50 and may measure a parameter value of interest relating to the beverage packaging process during the operation of the packaging factory 50. For example, in certain embodiments, the sensors 76 may include sensors configured to measure the rate of bottles or containers per minute (BPM) entering or leaving a machine component (i.e., stations 54, 56, 58, 64, 66, 68 or 70), or the rate of accumulation of bottles on a portion of a conveyor section (e.g., conveyor section 54 or 62). In general, any sensors 76 capable of measuring a parameter value of interest relating to the beverage packaging process of the packaging factory 50 (e.g., rate, pressure, speed, accumulation, density, distance, position/arrangement, quantity, size, and so forth) may be used.

In some embodiments, the packaging factory 50 may include a number of industrial automation power components 78 that may be used to control power used by various machine components in the packaging factory 50. The power components 78 may include devices, such as drives, motors, inverters, switch gear, and the like, which may be used to operate a corresponding machine component. For example, the conveyor section 54 may rotate using a motor, which may be controlled via a power component 78, such as a variable frequency drive.

The power component 78 may include a control system 22 that may monitor and control the operations of the respective power component 78. As such, the power component 78 may correspond to the component 20 described above with respect to FIG. 1. Referring back to the example above, the control system 22 of the power component 78, such as the drive used to control the motor rotating the conveyor section 54, may monitor a voltage provided to the motor and may determine the speed at which the conveyor section 54 may be moving. In one embodiment, the control system 22 of the power component 78 may send the data related to the speed of conveyor section 54 to the control system 22, or to other control systems that may control other components 20. In this manner, the control system 22 or to other control systems may be aware of the operations of the power component 78 and may account for these operations when determining how its respective component should operate.

Figure 4:
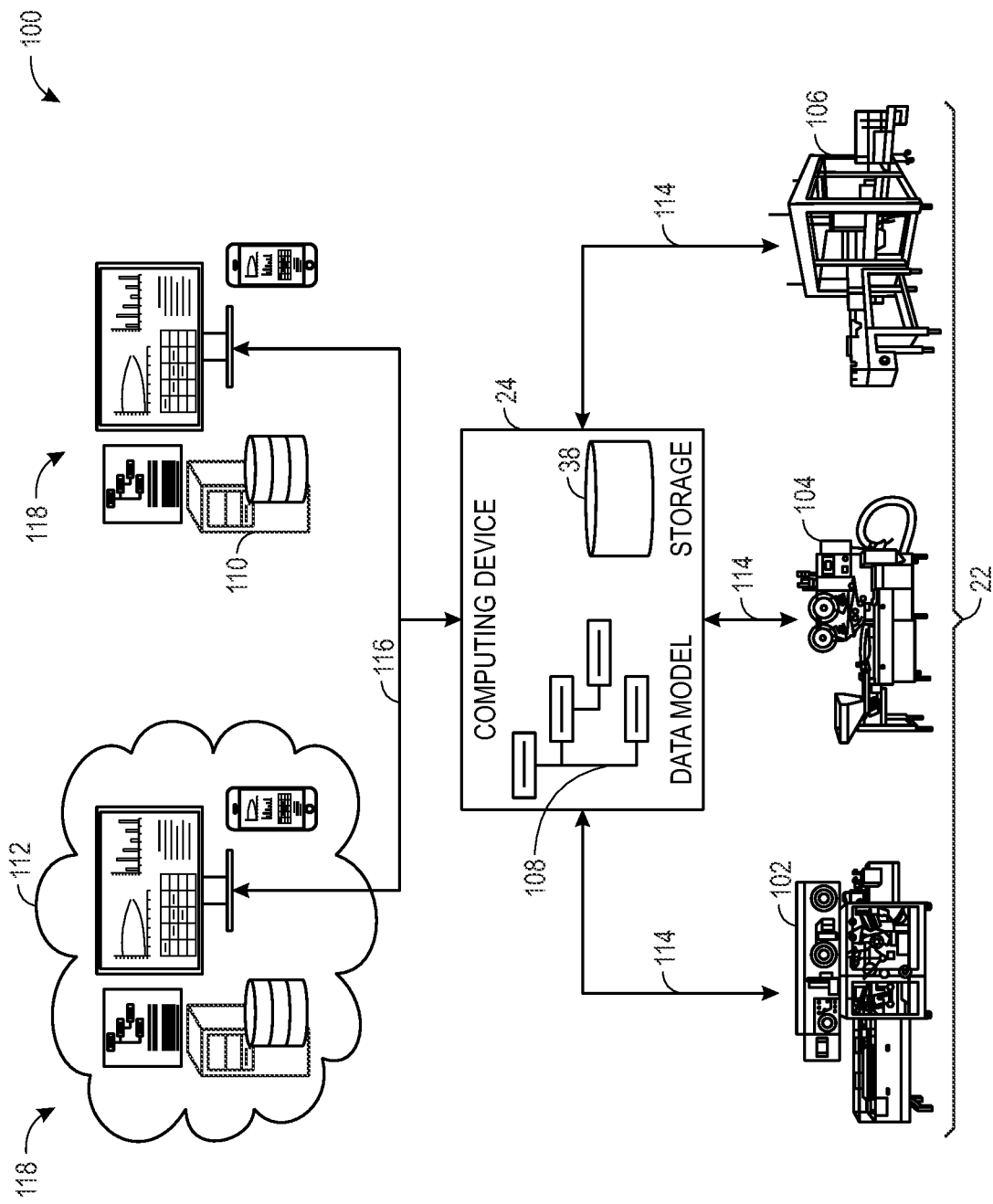
FIG. 4 illustrates a block diagram of relationships between a computing device and control systems that may be employed within the industrial automation system of FIG. 1, in accordance with an embodiment presented herein.

Keeping the packaging factory 50 of FIG. 3 in mind, the control system 22 may receive data from multiple power components 78 dispersed throughout the packaging factory 50. In some embodiments, the control system 22 may contextualize the received data with respect to pre-defined scopes or hierarchical levels. In other embodiments, the computing device 24 may query for data from the control system 22 and may contextualize the data according to different data models as described above. For example, FIG. 4 illustrates a communication network 100 in which the computing device 24 of the packaging factory 50 may be communicatively coupled to multiple components 20 and/or their respective control systems 22.

In one embodiment, the scopes of the packaging factory 50 may be categorized based on functions of the components 20 and/or the cells 18 of the packaging factory 50. For instance, referring to FIG. 3, the loading station 52 may be categorized as cell 1, the washing station 56 may be categorized as cell 2, the sealing station 60 may be categorized as cell 3, the sterilization station 64 may be categorized as cell 4, the labeling station may be categorized as cell 5, and the packaging station 68 may be categorized as cell 6.

In some embodiments, a user may define, access, and/or modify a data model 108 via the computing device 24. The user may include a factory operator personnel and may use a data destination component 118. The data destination component 118 may include a user interface and a data center, such as a local data center 110 or a cloud-based data center 112.

Keeping the foregoing in mind, the computing device 24 may use the communication component 32 to facilitate operations of the communication network 100. For example, the computing device 24 may use the communication component 32 to communicate with one or more control systems 22, such as a control system 102, a control system 104, and/or a control system 106. The control system 22 may monitor and/or control the operations of a component 20 or a collection of components 20 in a cell 18, an area 16, or a factory 12. For example, the control system 102, 104, and/or 106 may receive data or information from assets, controllers, and the like (e.g., the components 20) that may be located in the cells 18, the areas 16, or the factory 12. The computing device 24 may then receive the data collected from the control systems 102, 104, and 106 by using the communication component 32.

In one embodiment, the computing device 24 may receive data related to how the industrial automation system 10 may be subdivided, how each area 16, cell 18, and the various components 20 may interact with each other, which components 20 are part of each factory 12, area 16, or cell 18, or the like. For example, each area 16 may be related to a particular manufacturing process. As such, the data received by the computing device 24 may be processed or contextualized according to the data model 108. For example, the data model 108 may represent the received data as part of other datasets, under different labels, and/or in different hierarchy levels of a data structure hierarchy.

In certain embodiments, the computing device 24 may present the received data with context and in the form of the data model 108. The control systems 102, 104, and/or 106 may each identify a relationship of the one or more components 20 to a respective cell 18 or area 16 based on the data model 108. Subsequently, the control systems 102, 104, and/or 106 may provide the identified relationships to the computing device 24.

For instance, the computing device 24 may receive data from control systems 102, 104, and 106, each associated with different components 20. Upon receiving the data associated with the components 20, the computing device 24 may identify a data model, such as the data model 108, associated with the received data. The computing device 24 may then provide a representation of the received data according to the data model 108, thereby providing a user with context regarding the received data. For example, the data model 108 may indicate that the received data is associated with the factory 12, the area 16, the cell 18, and/or the component 20.

The data model 108 may be defined to process the received data associated with specific components 20. Moreover, the computing device 24 may use the data model 108 to extract specific details of each component 20. That is, the computing device 24 may process the received data to provide context to datasets received from each industrial component, such as speed, flow, temperature, and acceleration, among other variables. In addition, the data model 108 may provide contextualized data including associations or relationships with other devices, systems, plants, servers, types of devices, or other categories to classify the received data.

In some embodiments, the data model 108 may be pre-defined in the storage 38 of the computing device 24. The data model 108, a portion of the data model 108, or a component associated with the model 108 may be transmitted from the control systems 102, 104, and/or 106 to the computing system 24. In certain embodiments, a user may define the data model 108 for received data via a user interface of computing system 24, for example by using the display 42. The computing device 24 may receive instructions definitive of a data model 108, the computing device 24 may store the received data model 108 on the storage 38, and may use the user-defined data model 108 to organize the received raw data 114. Subsequently, the computing device 24 may provide the structured data 116 to the destination component 118 and/or the user in response to receiving the request for information (e.g., speed data, flow data, and temperature data).

The data model 108 may provide structure to the received raw data 114, such that the received raw data 114 may be provided to the user in the form of structured data 116. The structured data 116 may include datasets and/or one or more hierarchal representations of the datasets. The data model 108 may also be incorporated into a workflow that may include transaction conditions and conditional transactions between components of the data model 108 while providing the structured data 116 with the transferred datasets. In some embodiments, the user may define such transactions by determining one or more aspects of the datasets based on the data model 108 via the computing device 24. In different embodiments, the user may define the transactions by specifying how the datasets are to be retrieved and transferred based on one or more relationships between the datasets of the data model 108. For example, the user may define a transaction to retrieve datasets from data components of a data model associated with a data source, and transferring the retrieved datasets to data components of a different data model that may be part of the data destination component. The different data model may be data model provided by a third party provider in the local data center 110 or the cloud-based data center 112 to facilitate the transfer.

Figure 6:
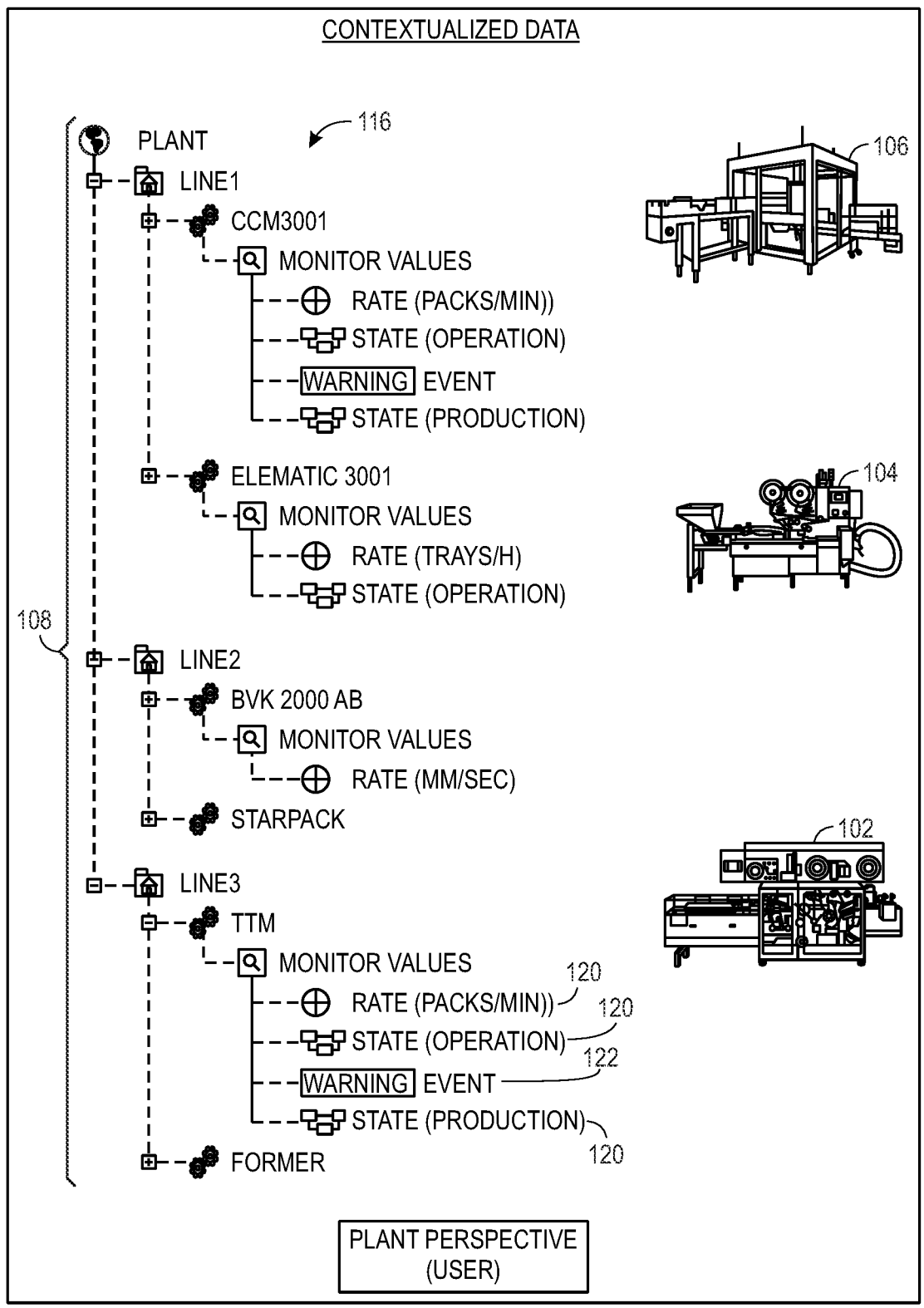
FIG. 6 illustrates a hierarchically structured data organized according to a data model by the computing device of FIG. 1, in accordance with an embodiment presented herein.

The datasets may correspond to different factories, areas, cells, components, and/or properties of components, among other things, as shown in more detail in FIG. 6. The relationships of the datasets may correspond to how different factories, areas, cells, and/or components are related to each other. For example, in a hierarchical representation of the datasets, a factory dataset may include one or more area datasets.

The computing device 24 may then provide structured data 116 to the local data center 110 or the cloud-based data center 112. For example, the computing device 24 may receive a request for information and provide contextualized data in response to receiving the request using the data model 108. The computing device 24 may provide the contextualized data to a data center or the user. That is, the computing device 24 may provide a portion of the structured data 116 to the data center or the user in response to receiving the request for information (e.g., speed data, flow data, and temperature data).

Figure 5:
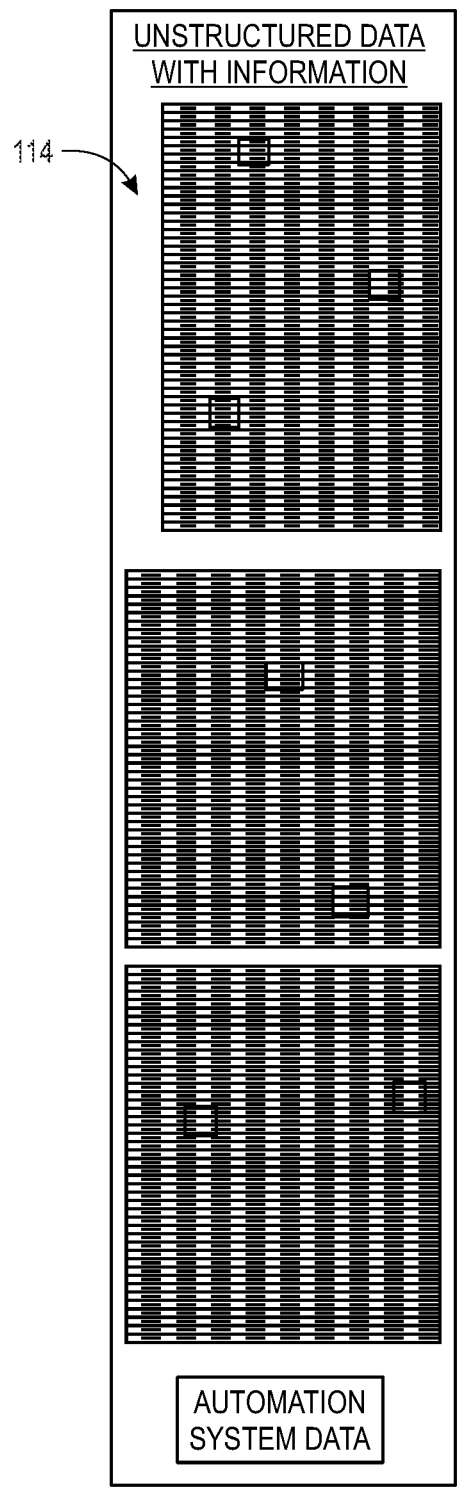
FIG. 5 illustrates unstructured raw data that may be transmitted by control systems of FIG. 4, in accordance with an embodiment presented herein.

By the way of example, FIG. 5 illustrates raw data 114 that may be transmitted from the control systems 102, 104, and/or 106 to the computing system 24. The raw data 114 may be unstructured and may include all the data provided by the control systems 102, 104, and 106. Since the raw data 114 is unstructured, processing the raw data 114 may prove to be comprehensive and computationally expensive due to the lack of structure or organization.

On the other hand, FIG. 6 depicts an example of structured data 116 organized according to the data model 108. The data structure 116 may be associated with the hierarchy levels of the data model 108 and the respective data sources, such as control systems 102, 104, and/or 106. As such, hierarchical representation of the data structure 116 may include different datasets 120 in hierarchical levels corresponding to different factories 12 or 14, areas 16, cells 18, components 20, properties of individual components 20, and other properties of one or more datasets to name a few examples. Indeed, the data structure 116 may detail a relationship between datasets 120 with respect to hierarchy, dependencies between datasets 120, and the like.

In some embodiments, the computing device 24 may also receive transaction data 122 related the structured data 116. The transaction data 122 may include event driven conditions that specify one or more conditions in which data is to be transmitted to other components. Moreover, the transaction data 122 may specify details that help facilitate a dataset transaction between a data source and a data destination. The transaction data 122 may be received based on a selection of a driver or a data collection scheme/format to retrieve data from a data source received by a user input. In this way, the driver may detail how transactions between different components are to be facilitated. In one embodiment, a user may select a driver that represents the manner (e.g., format) in which the requested datasets are to be retrieved from a data source. By way of example, the driver may be defined as FactoryTalk Live Data, EtherNet/IP (Common Industrial Protocol (CIP)), OPC Direct Access (e.g., machine to machine communication protocol for industrial automation developed by the OPC Foundation), or any suitable communication protocol. In some embodiments, the transaction data 122 may be defined for each component or each type of component that may be associated with the factories, areas, cells, and the like. In addition to the communication protocol, the transaction data 122 may include one or more defined rules, relationships, and/or triggering events that characterize how datasets are stored the data model 108.

The hierarchy representation of the structured data 116 may be pre-defined, user-defined, or modifiable by a user by the way of a graphical user interface (GUI) visualization as described in more detail below. It should be understood that the visualization is describing one embodiment and the interaction between a user and the computing device 24 may be provided by any viable interface.

Figure 7:
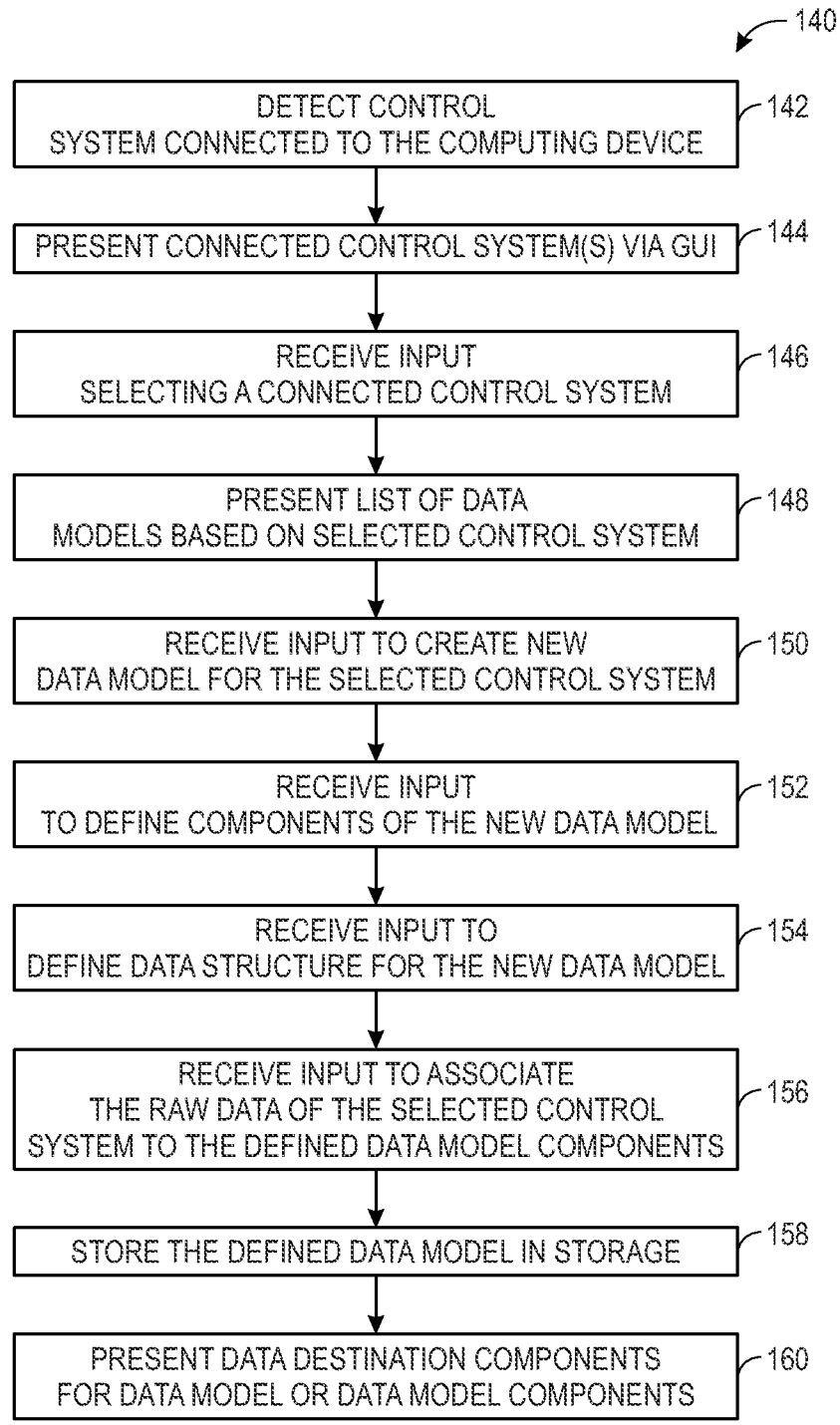
FIG. 7 illustrates a flowchart of a method for defining data structure by the computing device of FIG. 1, in accordance with an embodiment presented herein.

With the forgoing in mind, FIG. 7 illustrates a procedure 140 for contextualizing raw data according to a data model, such as the data model 108. The procedure 140 may be performed by the computing device 24 or any suitable computing device for defining datasets 120 and/or the transaction data 122. It should be understood that the order of the procedure 140 is provided by way of example and the procedure 140 may be performed in any suitable order.

Referring now to FIG. 7, at block 142, the computing device 24 may detect the one or multiple control systems 22, such as control systems 102, 104, and/or 106 of the FIG. 4. Control systems 22 may communicatively couple to the computing device 24 using wired connection or wireless connection. In different embodiments, the computing device 24 may detect the control system 22 upon connection, for example by the way of a pre-installed driver on the computing device or a respective driver module for the connected control system 22.

At block 144, after detection of the one or multiple connected control systems 22, the computing device 24 may present the connected control systems 22 via a display. For example, the computing device 24 may provide a list of all the detected control systems 22 as illustrated in visualization 170 of FIG. 8. The visualization 170 may include detected control systems 22 and/or other viable sources of data represented for selection by the user, when a data sources tab 194 is selected. That is, the user may define the data model 108 using the data sources presented by the visualization 170. In some examples, the sources of data in the visualization 170 are auto-detected, whereas in other examples, the visualized sources of data or at least a number of visualized sources of data are configured by the user.

Figure 8:
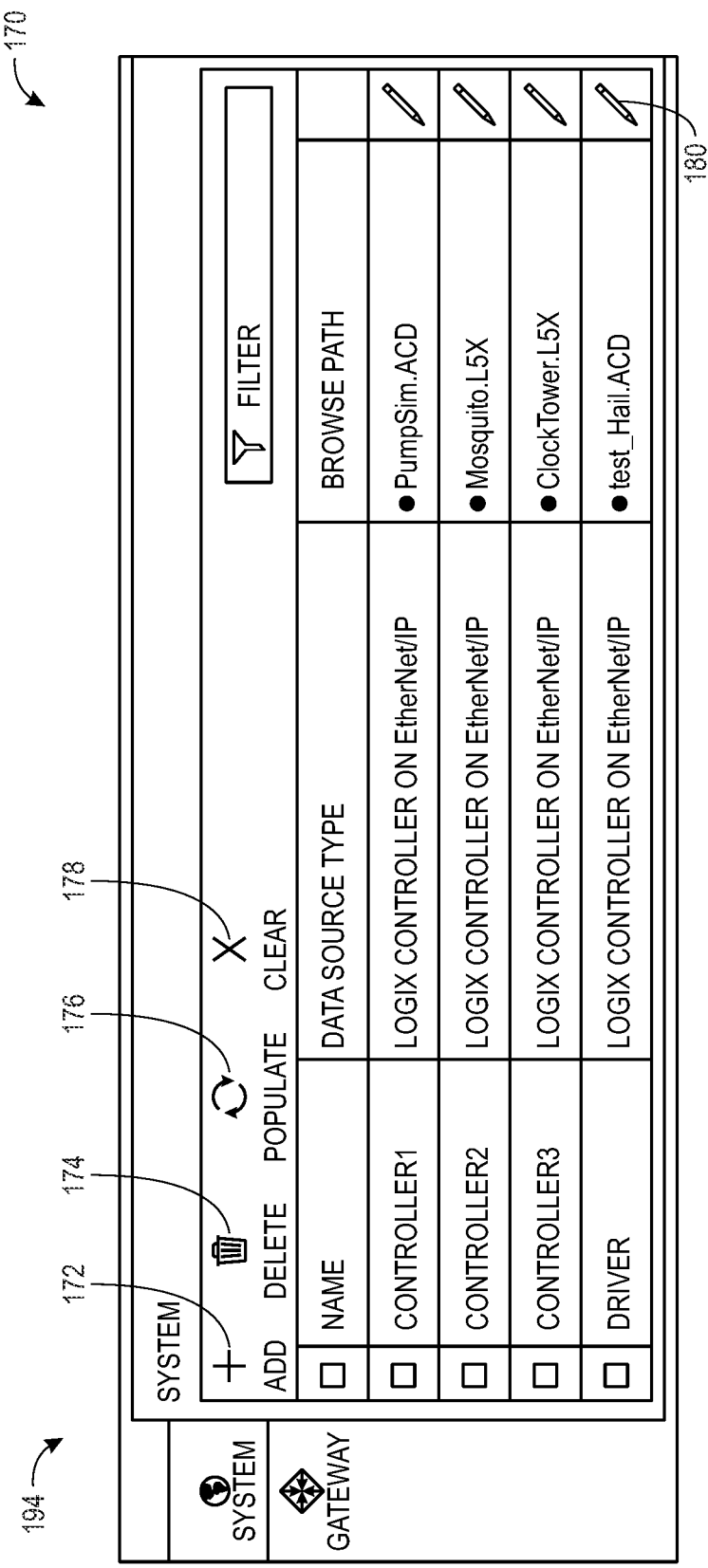
FIG. 8 depicts an example visualization that presents the connected control systems to a user, in accordance with an embodiment presented herein and block 144 in the flowchart of FIG. 7.

Referring to FIG. 8, the visualization 170 may provide the user with additional functionality. The additional functionality may include adding new control systems using an input visualization 172, removing a detected control system using an input visualization 174, refreshing the list of control systems using an input visualization 176, clearing the list of control systems using an input visualization 178, and/or editing properties of the detected control system using an input visualization 180. Referring back to FIG. 7, at block 146, the computing device 24 may receive input indicative of a selection of a detected control system 22 as a first source of data. After receiving the selection, the computing device 24 may access the selected control system 22 and receive raw data 114 associated with the selected control system 22.

Figure 9:
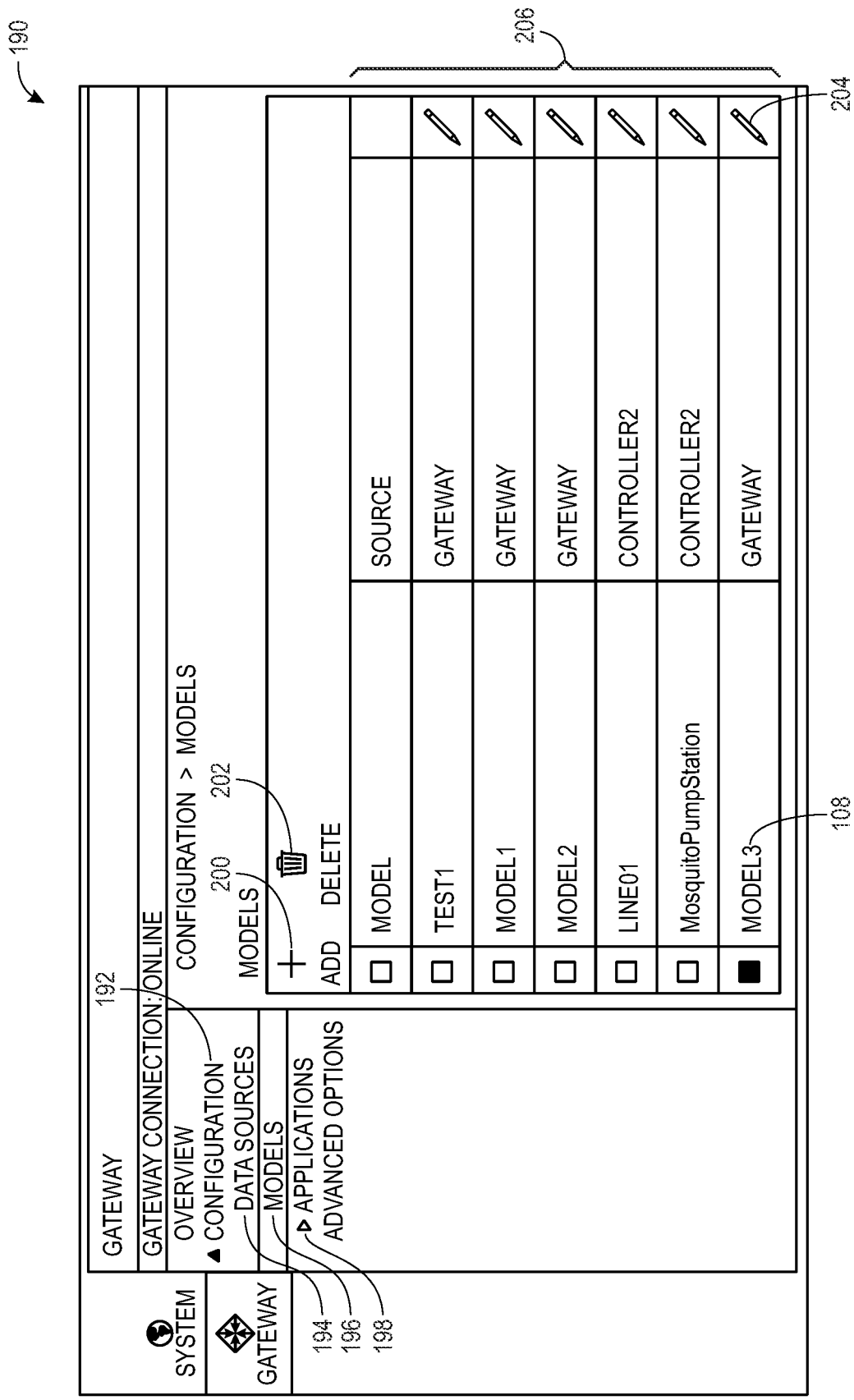
FIG. 9 depicts an example visualization that presents a list of data models to the user, in accordance with an embodiment presented herein and block 148 in the flowchart in FIG. 7.

At block 148, the computing device 24 may present a list of data models 108 that may be used for contextualizing data associated with the selected control system 22 at block 146. FIG. 9 may depict an embodiment of a visualization 190 that provides an example list of data models 108 selectable by the user via display 42.

The visualization 190 may include a configuration tab 192 including one or multiple child tabs. For example, the child tabs may include the data sources tab 194, a models tab 196, and an applications tab 198. The data sources tab 194 may include one or multiple control systems 22 selectable by the user to identify sources of data. The models tab 196 may include the data models 108 selectable by the user to be used with the selected sources of data (e.g., one or multiple control systems 22). The applications tab 198 may include the destination components 118 where the structured data 116 may be sent. The models tab 196 and the applications tab 198 are discussed in more details below. It should be appreciated that in different embodiments, a visualization for contextualizing raw data according to a data model may include additional or fewer tabs, may visualize a single tab including different portions associated with different information such as selectable data sources, selectable data models, and/or selectable data destination components or applications to be used.

Referring back to FIG. 9, the models tab 196 may include multiple data models 206 available for selection by the user. For example, the user may select the data model 108 to be used with a selected control system 22, as depicted in the FIG. 9. Furthermore, a user may create data models via add data model feature 200, remove existing data models via delete data model feature 202 and/or edit the existing data models 108 via edit data model feature 204 of the visualization 190. The data model 108 may define a hierarchy or relationship between different datasets in the data model 108

At block 150, the computing device 24 may receive input to create a new data model for the selected control system. The user may use the add data model feature 200 of visualization 190 to create the data model 108. The add data model feature 200 may prompt the user to provide details for the new data model 108. For instance, the add data model feature 200 may prompt the user to a visualization 210 depicted in FIG. 10 and may include an example of tools provided to the user for creating a hierarchical representation 134 associated with components of the data model 108. In some embodiments, one or multiple properties associated with the data source, the detected control system, the respective sensor, and/or the industrial automation component may be configured, re-configured, and/or used as a triggering event by the user via a properties pane 220 described with respect to FIG. 10.

The visualization 210 may include the sources of data, such as the one or multiple control systems 22 (e.g., as described with respect to visualization 170), which may be represented by tags 216 (e.g., SmartTags). A dataset or a portion of a dataset of the one or multiple datasets 120 may be represented by the tags 216. For example, the user may use an input visualization 218 to add and/or describe the tags 216 to represent a control system 22 or a portion of data sourced from the control system 22. The visualization 210 may also include the data model 108, for example selected previously in the visualization 190 by the user, or defined by the user using the add data model feature 200. Moreover, the visualization 210 may include the properties pane 220 including one or multiple properties associated with a selected data source (e.g., by selecting a data source) or a selected component of the data model 108 (e.g., node 1 or child 2).

In some embodiments, the user may select a component 222 of the data model 108 using the visualization 210 and one or multiple properties 224 associated with the selected component 222 may be provided to the user via the properties pane 220. The selected component 222 may be the dataset 120, and may include the transaction data 122, among other components. The properties 224 may include different values associated with the selected component 222, values associated with datasets associated with the selected component 222, the transaction conditions associated with the selected component 222, or other properties associated with the selected component. For example, the properties 224 may include a visualization of values of datasets associated with the selected component 222. Moreover, the properties pane 220 may include properties associated with the transaction data 122. That is, the properties pane 220 may provide a visualization of transaction data 122, including event driven conditions that specify one or more conditions in which data associated with selected component 222 may be transmitted to other components, one or more defined rules, relationships, and/or triggering events that characterize how datasets associated with the selected component 222 are stored the data model 108, and/or other properties associated with the selected component 222. The user may define and/or modify the transaction data (e.g., transaction data 122) using the properties pane 220.

At block 152, the computing device 24 may receive input to define components of the data model 108. The visualization 210 may include an add component feature 212 and a remove component feature 214 that may add and remove components to the data model 108. By the way of example, the user may use the add component feature 212 to define a parent component "node 1" and a child component "child 2". For example, the parent component "node 1" may be defined as a parent component that includes the child component "child 2" as described below.

Figure 10:
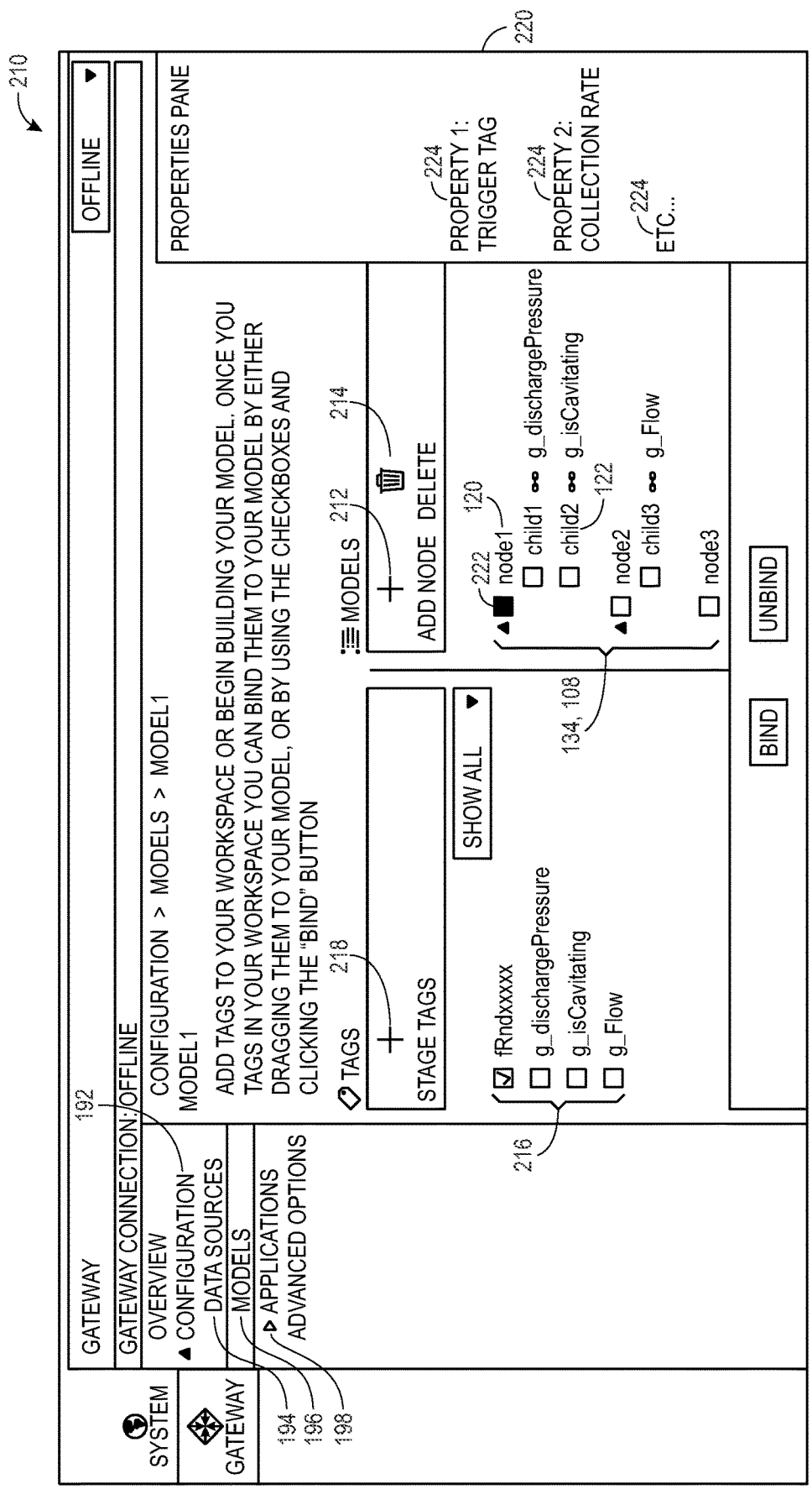
FIG. 10 depicts an example visualization that presents a hierarchical representation of components of the data model, in accordance with an embodiment presented herein and block 150 in the flowchart in FIG. 7.
Figure 11:
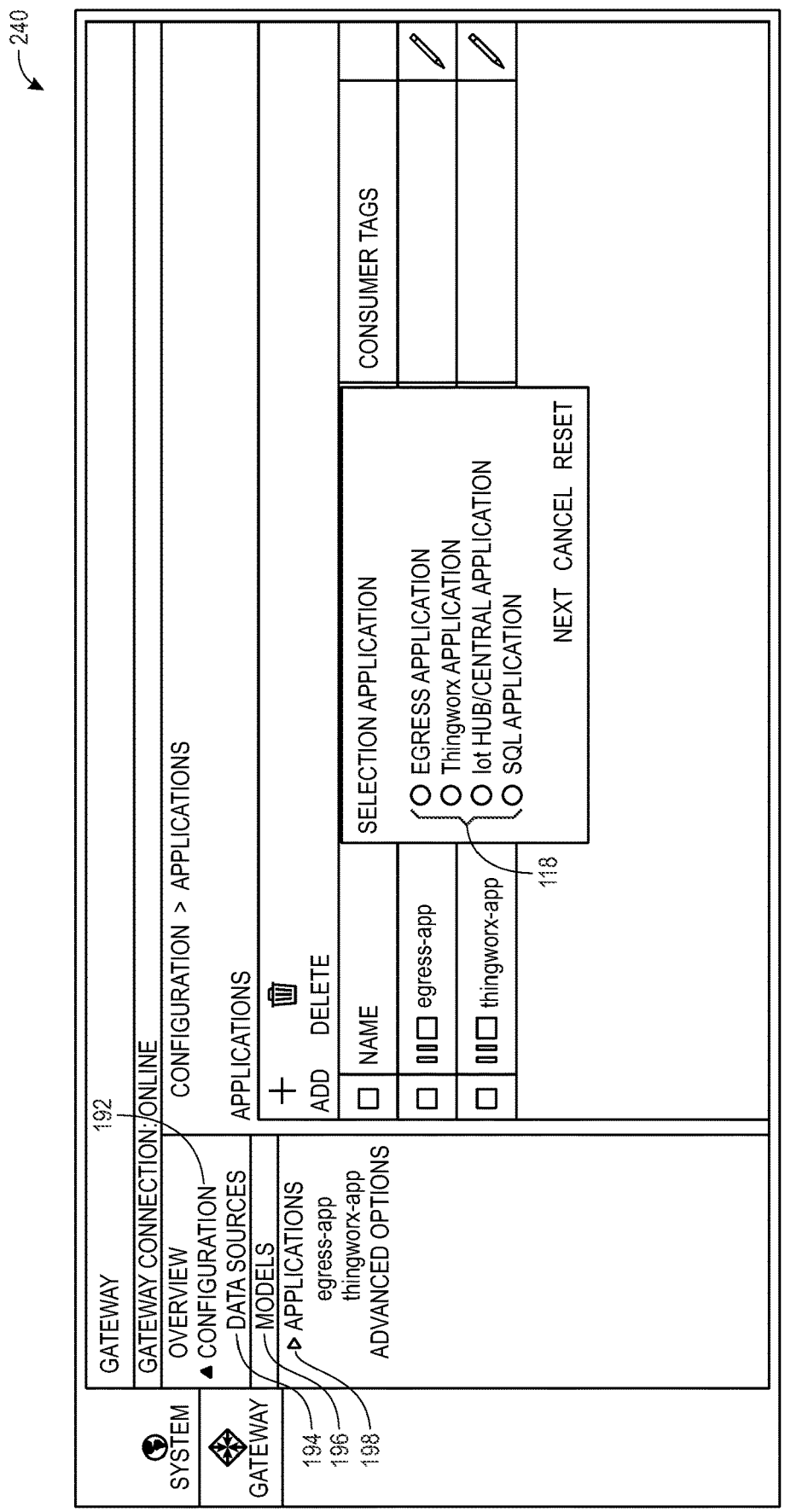
FIG. 11 depicts an example visualization that presents available data sources for selection by the user, in accordance with an embodiment presented herein and block 156 in the flowchart in FIG. 7.

At block 154, the user may receive input to define a data structure, such as the hierarchical representation 134, associated with a selected part of the data model 108. For example, the user may associate data model component "node 1" to the data model component "child 2", such that the data model component "child 2" is represented as being a part of the data model component "node 1", as depicted in FIG. 10 as part of the hierarchical representation 134. In this way, the user is enabled to define the hierarchical representation 134 of the structured data 116. That is, the user may bind tags to associate the data model components by using different features in different embodiments, such as drag and dropping the tags 216 to hierarchical level in the hierarchical representation 134 to associate datasets to other components. In different embodiments related to the described methods, the user may associate different number of data model components to define the hierarchical representation 134. It should be noted that components of the data model 108 may include the datasets 120 (e.g., represented by the tags 216) along with transaction data 122. The user may describe a workflow that specifies how the datasets 120 and the transaction data 122 is used.

In such embodiments, the user may define one or multiple datasets 120 and/or the transaction data 122 for each of the hierarchical levels of the data model 108, for particular datasets in the data model 108, for different data sources in the industrial automation system 10, and the like. The transaction data 122 may include triggering events defined with respect to properties 220 of a selected component of the data model 108. The workflow may be defined using transaction data (e.g., transaction data 122) with transaction conditions that may define a relationship between the components of the data model 108, and/or between the components of the data model 108 and other data models and/or data destination component 118. The workflow may include one or multiple triggering events, conditional relationships, or a combination of both, using the properties 224 of a selected component (e.g., the selected component 222). For example, one or multiple conditions (e.g., temperature to exceed 200 degrees) may be satisfied with respect to properties of the retrieved data in order for the computing device 24 to perform certain actions (e.g., data transfer, control equipment) with respect to the retrieved data or other components in the industrial automation system 10. The workflow may also automate a process internal to the components of the data model 108 and/or by mapping the components of the data model 108 to one or multiple external data models.

Moving on to block 156, the computing device 24 may receive input to associate the raw data 114 of the selected control system 22 to a part of data model 108 and/or one or more data model components. By the way of example, a user may select data model component "node 1" and the data sources tab 194 to select one or more data sources (e.g., the selected control system 22) to be associated with the data model component "node 1". Multiple tags 216 may represent available data sources configured, for example, using the visualization 170 of FIG. 8. That is, the user may select one or more data sources from an available data sources window, as depicted in visualization 170 of FIG. 8, to be associated with the data model component "node 1". The user may repeat this process for "child 2" and other components of the data model 108.

At block 158, the computing device 24 may store the defined model(s) in the storage 38. The data model may be saved on the memory 36 or storage 38 of the computing device 24.

At block 160, the computing device 24 may present the available data destination components 118 in which the data, data model 108, or both may be sent, in response to the applications tab 198 is selected. For example, FIG. 11 may include a visualization 240 that may depict the application tab 198 of the configuration tab 192. The application tab 198 may include multiple data destination components 118. The application tab 198 may enable the user to select one or multiple data destination components 118. The data destination components 118 may include a local data center 110, the cloud-based data center 112, and various other applications or programs that may be used to store, organize, or analyze the data. The user may associate the new data model 108 or specific components of the new data model 108 to one or multiple data destination components.

Figure 12:
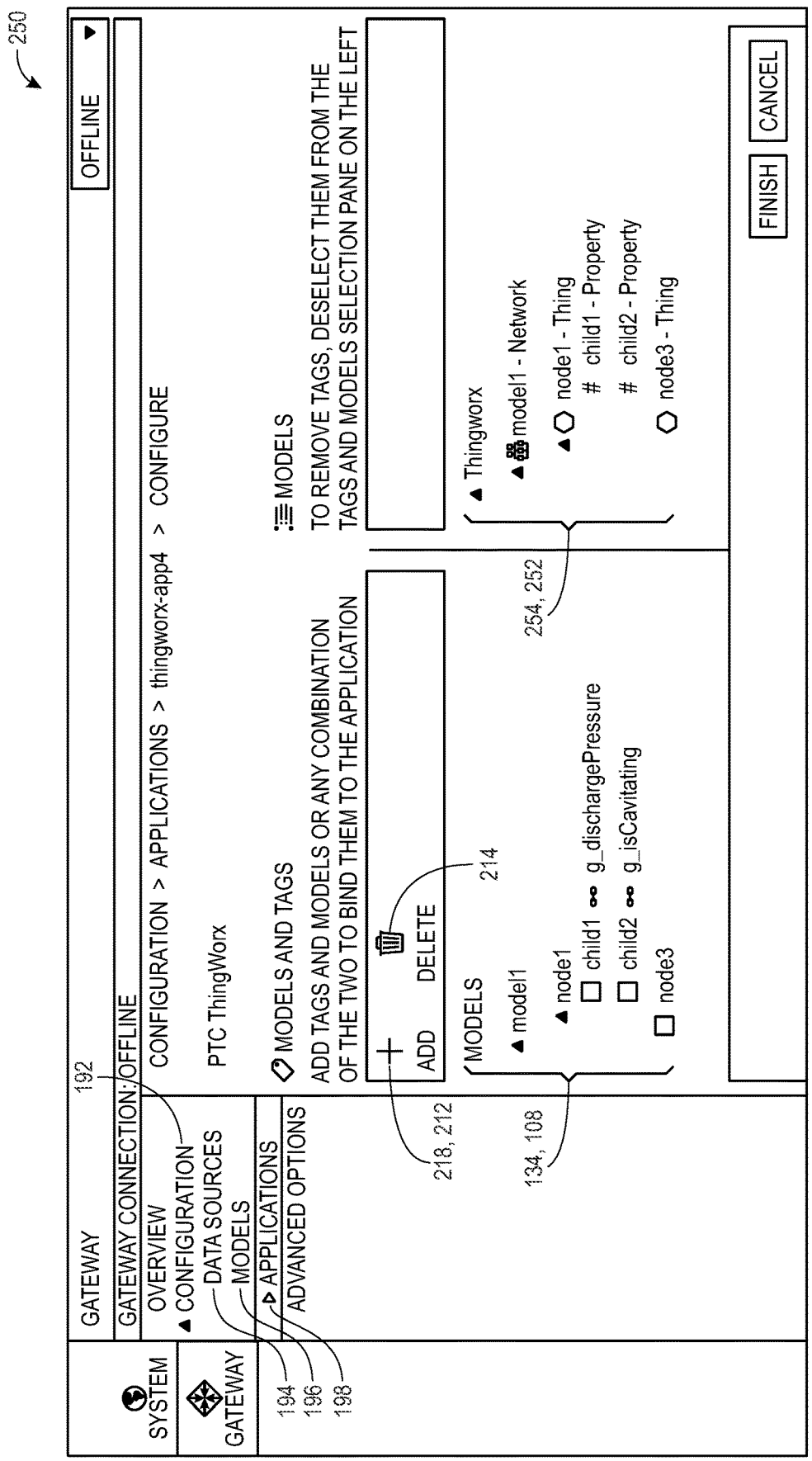
FIG. 12 depicts an example visualization that presents an application tab including multiple data destination components, in accordance with an embodiment presented herein and block 160 in the flowchart in FIG. 7.

The selection of the application may include mapping one or more datasets 120 of the data model 108 to one or multiple datasets associated with a second data model associated with a third-party application. For example, FIG. 12 depicts a visualization 250 including the data model 108 and a second data model 252 associated with a third party application. The second data model 252 may be selected by the user using the applications tab 198 and the visualization 240 of FIG. 11. In some embodiments, the user may use the described tools to describe a workflow that coordinates how the datasets 120 are retrieved and stored based on the transaction data 122. In this way, the datasets 120 may be tailored to a specific third-party application in accordance to the transaction data 122, which may be specified by the user. Indeed, the transaction data 122 may be configurable, such that the datasets 120, conditions for collecting the datasets, and conditions for mapping the datasets to a destination component 118 within the second data model 252 may be configurable or set by a user.

It should be noted that the procedure 140, visualization 170, visualization 190, visualization 210, visualization 240, and visualization 250 described above are provided for illustrative and descriptive purposes and should not be used as limitations to the scope of the disclosure. For instance, the procedure 140 may be performed in any viable order, some procedure steps may be added, and some of the aforementioned blocks may be removed partly depending on the application of the procedure. Any viable electronic display may be used with the computing device 24, including a non-graphical user interface. The viable user interface may provide a coherent data flow between an industrial automation system 10 and various data destination components 118 in different embodiments.

Figure 13:
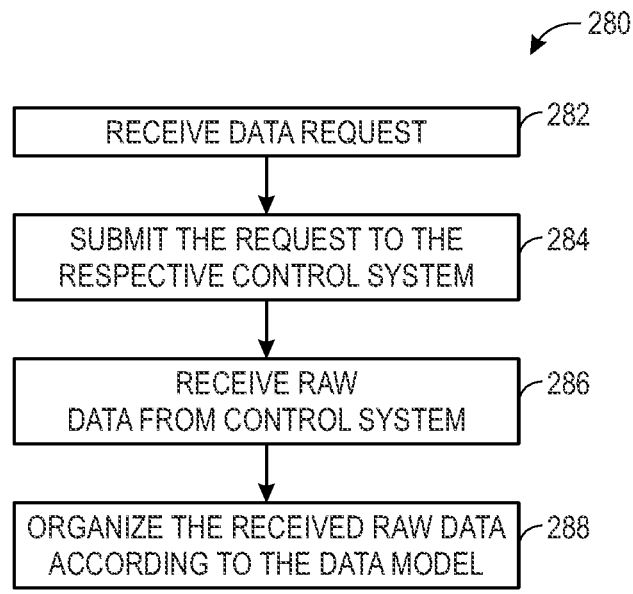
FIG. 13 illustrates a flowchart of a method for using the computing device of FIG. 1 to transmit data organized according to a data model, in accordance with an embodiment presented herein.

As described above, the procedure 140 may be used for defining the data model 108 or a selected part of the data model 108 by the user. Referring now to FIG. 13, a process 280 may describe an example for requesting and receiving data from the control system 22 using the defined data model 108. For example, the computing device 24 may use the data model 108 to provide contextualized data to a data requestor using the process 280 as described in detail below.

At block 282, the computing device 24 may receive a data request. The data request may be from the data destination component 118, based on the transaction data 122, or both. As discussed above, the transaction data 122 may define a trigger or threshold for a value in a dataset that causes the request to be sent from the data destination component 118. Alternatively, the computing device 24 may automatically generate the request based on the value in the dataset meeting or exceeding the threshold defined in the transaction data 122. For instance, if the dataset corresponds to pressure data, the transaction data 122 associated with the pressure data may specify that the pressure data should be sent to the data destination component 118 if the value exceeds 2250 psa. In any case, in response to receiving the data request, the computing device 24 may use the data model 108 to identify a respective control system 22 associated with the requested data.

At block 284, the computing device 24 may submit the data request to the respective control system 22. In some embodiments, the request may be associated with one or multiple respective control systems 22 and may be formatted in accordance with conditions specified in the transaction data 122. That is, the transaction data 122 associated with the requested dataset may specify a communication protocol (e.g., request type, syntax, communication port) that the computing device 24 should use to request access.

At block 286, the computing device 24 may receive raw data 114 from the respective control system 22. In some embodiments, the computing device 24 may receive the raw data 114 with a respective data model, such as the data model 108, from the respective control system 22. That is, the data model 108 may be part of the metadata of the raw data 114, may be stored in a database accessible to the computing system 24, provided with the request, part of the transaction data 122, or the like. As such, the computing device 24 may use the data model 108 to provide context for the received raw data 114.

At block 288, the computing device 24 may send the requested data to the data destination component 118. In some embodiments, the computing device 24 may organize the raw data according to the data model 108. For example, the computing device 24 may structure the received raw data 114 with respect to the received data model 108 and send the structured raw data 114 to the data destination component 118. For instance, if the requested raw data 114 is associated with a child node of another dataset, the computing device 24 may send the requested raw data 114 with the datasets associated with the parent node.

In some embodiments, the computing device 24 may send the requested data to the data destination component 118 as structured data in accordance with the data model 108 or with reference to the data model 108. In any case, the data destination component 118 may, in turn, store the data in accordance with the data model 108. As such, the data sets retrieved by the data destination component 118 may maintain its context providing a user with a more comprehensive view of the relational nature of the datasets.

By performing the embodiments described herein, computing systems may bind data sets, data models 108, and transaction data 122, such that data destination components 118 (e.g., applications) may efficiently collect and organize data with its appropriate context. That is, the binding process associates tags, models and transactions with an instance of an application such that pre-defined properties or defaults may be utilized for storing and/or collecting datasets in an efficient manner. Moreover, the present embodiments described herein enable new properties to be entered by a user for a particular instance (e.g., dataset) to allow datasets to be contextualized for more effective data presentation. It should be noted that the structured context of the datasets and the conditions of the transactions described herein enable the respective computing devices to operate more efficiently by coordinating the flow of data through limited network connection bandwidths. Further, the contextualized data provides a specific format in which datasets can be stored to enable users to understand and other devices to process the datasets more effectively.

Adapter Component for Transferring Data to External Platforms

In addition to binding the datasets 120, the transaction data 122, and other types of data to contextualize data employing the data model 108, the present embodiments described herein are also directed towards systems and methods for adapting or implementing certain functions using an adapter component that may be part of the computing device 24 to export the contextualized data to external devices. More specifically, the present disclosure is related to leveraging tools provided in a software development kit (SDK) or other tools provided by an external platform, such that functions that operate with the external platform may be executing natively by the computing device 24 using the adapter component.

Because of the large number of system variables that may be monitored and controlled in real time or near real-time, the computing device 24 may monitor data generated by the industrial automation system 10, which may be associated with vast amounts of near real-time data. The large quantity of data generated by the industrial automation system 10 may make it possible to apply a broad range of plant analytics to the automation systems and processes that make up an industrial enterprise or business. Reports, charts, and other human-readable formats are often available or may be created for plant personnel and others wishing to monitor and review the generated data in either a real-time mode or at a later time after the data has been stored.

With this in mind, the computing device 24 may employ an adapter component to acquire the industrial automation data for purposes such as those described above from various data sources that are located in the industrial automation system 10. The adapter component (e.g., implemented in hardware or software) may interact with a respective external platform via a respective protocol and appropriately translate/interpret the data received from each data source to acquire the data stored therein. In addition to acquiring the data from various data sources, the adapter component may interact with external software platforms (e.g., IoT platforms) that may provide visualization tools, analytic tools, monitoring tools, and the like to help organize and glean information from the collected data.

With the foregoing in mind, an industrial automation system 10 may provide the structured data 116 to an external component (e.g., external platform, external device) such as a data center, operational technology (OT) systems, and/or information technology (IT) systems. The external component may use a different data structure for storing and/or processing the data. In some embodiments, the computing device 24 may generate and use an adapter component to associate the structured data to the data structure of the external component using a native data model (e.g., the data model 108) of the industrial automation system 10.

In some embodiments, the computing device 24 may obtain an application program interface (API) and/or a software development kit (SDK) of the external component. The API and/or SDK may specify an external data model (or part of the data model) that is to be used by the external component. The computing device 24 may determine a relationship between the structured data 116 of the data model 108 and the external data structure of the external component based on the obtained API and/or SDK. Using the relationship between the structured data 116 and the external data structure, the computing device 24 may generate the adapter component. The adapter component may associate data and the context of the data of the data model 108 to the external data structure of the external component. As such, the computing device 24 may use the adapter component to provide data with context according to the identified relationship to the external component.

In specific embodiments, the computing device 24 may provide a dedicated adapter component for mapping structured data to an external data structure of each external component connected to the computing device 24. For example, the computing device 24 may provide different adapter components for different external components based on obtaining the respective APIs and/or SDKs. That said, in some other embodiments, the computing device 24 may determine an adapter component for mapping structured data 116 to multiple external components. For example, the computing device 24 may provide an adapter component for multiple external components based on obtaining the respective APIs and/or SDKs. Nevertheless, by providing and using the adapter components, the computing device 24 may use a native data model while providing structured data to external components configured using a different data structure.

FIG. 14 illustrates a communication network 300 in which the computing device 24 of the packaging factory 50 may be communicatively coupled to multiple components 20 and/or their respective control systems 22. In the depicted embodiment, the computing device 24 may receive raw data 114 from the control systems 102, 104, and/or 106. Moreover, the computing device 24 may determine the structured data 116 according to the data model 108 detailed above. As mentioned above, the computing device 24 may provide the structured data 116 to the data destination component 112.

In the depicted embodiment, the computing device 24 may also provide the structured data 116 to an external component 302 by mapping the structured data 116 to a data model of the external component 302. For example, the computing device 24 may communicatively couple the external component 302 using a Web Socket connection. However, in other embodiments, other suitable connections may be used. Nevertheless, the computing device 24 may obtain an API and/or SDK data 304 of the external component 302 to facilitate data communication with the external component 302 using the native data model of the computing device 24 (e.g., the data model 108).

The API and/or SDK data 304 may provide a representation of the expected data structure of the external component 302 to the computing device 24. The computing device 24 may generate an adapter component 306 based on the received API and/or SDK data 304. That is, the computing device 24 may generate a software engine or program a hardware component (e.g., logic circuitry) to operate as the adapter component 306 to facilitate providing a representation of the structured data 116 to the external component 302 using the data structure of the external component 302. The adapter component 306 may identify a relationship between the data model 108 and the data structure of the external component 302 based on the API and/or SDK data 304.

In some embodiments, the adapter component 306 may include logic circuitry to identify and provide the relationship between the data model 108 and the structured data of the external component 302. In some embodiments, the adapter component 306 may generate an endpoint 308 based on the mapped relationship between the data model 108 and the data structure of the external component 302 to communicate structured data 310. The structured data 310 may be data received by the adapter component 306 and organized according to an external data structure interpretable by the external component 302. The endpoint 308 may be a port or point of communication that may stream data directly to the external component according to the external data structure. For example, the computing device 24 may use the endpoint 308 as a proxy for providing contextualized data to the external component 302. That is, the adapter component 306 may modify the structured data 116, such that the endpoint 306 may receive the structured data 310, which may be provided directly to the external component 302.

By way of example, model structures (e.g., data model 108) generated from a function provided within the computing device 24 may not be carried through to the external component 302 without manually receiving the data and manually creating the model structure of the external component 302. However, the adapter component 306 may replicate the model structure and tags within the external component 302 by accessing an API and/or SDK data 304 of the external component 302, as mentioned above. For instance, in one embodiment, the adapter component 306 may call this API and/or SDK data 304 from the computing device 24 through a Web Socket connection over a network TCP/IP connection. This would result in a performance gain over other applications that may use other protocols or APIs (e.g., REST API) over other connections (e.g., HTTP connection).

Moreover, the adapter component 306 may use the API and/or SDK data 304 of the external component 302 to automate a setup and configuration of applications, data entries, and the like within the external component 302 without performing a manual input or a file export and import operation. For example, in one embodiment, the adapter component 306 may use an SDK (e.g., of the API and/or SDK data 304) associated with the external component 302 to generate tools, functions, APIs, and the like that may enable the adapter component 306 to interface with the external component 302. In this way, the adapter component 306 may leverage its translation and interconnectivity capabilities with the tools provided in the SDK of the external component 302 to create native tools and commands that may enable a user to generate and execute functions that will be performed on the external component 302 via the computing device 24. As a result, the data generated or acquired using the native tools of the computing device 24 may be provided to the external component 302, such that the external component 302 may maintain the data format, tags, and other properties generated within the computing device 24.

In some embodiments, the computing device 24 may coordinate with the adapter component 306 to employ the native tools generated using the SDK of the external component 302 to perform automated operations in the external component 302. For example, data acquired by the computing device 24 may include an information model (e.g., data model 108) that provides relationship data regarding the respective data with other datasets. To provide this context to the external component 302, the adapter component 306 may parse the data using the tools to identify the corresponding information model associated with the external component 302. The adapter component 306 may then generate commands for performing operations that include sending the data and the information model to the external component 302. The commands, when received by the external component 302, may cause the external component 302 to create data entries, such that the context of the received data is stored within the external component 302 using the format of the external component 302. That is, the commands may cause the external component 302 to automatically create the data entries and bindings to represent the data received by the external component 302 in accordance with the corresponding information model based on the data model 108 stored with the computing device 24.

Keeping the foregoing in mind, in some embodiments, the external component 302 may correspond to one or more applications in communication with the computing device 24, applications being executed on the computing device 24, and the like. Each external component 302 may be accessed or executed by one or more other client devices and may seek data stored or contained in data storages or data sources coupled to adapter components 306. Indeed, the external component 302 may be accessed by the client devices, which may seek to acquire data stored in one or more of data sources that are inaccessible to the client devices. To facilitate the connection of the external component 302 to appropriate data sources, the computing device 24 may receive data communications from the external component 302 and route the data communications to the adapter component 306 associated with the particular external component 302. As discussed above, the adapter component 306 may convert or modify the data communications received from the external component 302 into a format or the data model 108 that is discernable by the computing device 24.

In addition, the adapter component 306 may use a certain protocol that enables it to interact with the external component 302 and acquire the data therefrom. As a result, the adapter component 306 may allow a variety of applications to request the data from a variety of data sources without the respective host device directly connecting to the data source and without the external component 302 or the computing device 24 to be configured with any particular protocol to communicate with the respective data source. That is, the adapter component 306 may enable the computing device 24 to bridge between various client devices and other industry standard devices, protocols, and applications.

In some embodiments, the adapter component 306 may also provide the ability to perform certain operations on the external component 302 that may collect, analyze, and store data provided by the computing device 24. Indeed, some of these operations may include creating entities or entries within the external component 302 from outside sources via the adapter component 306, reading entity structures and data from the external component 302 for outside sources (e.g., client devices) via the adapter component 306, updating and modifying entity structures and data in the external component 302 from outside sources (e.g., client devices) via the adapter component 306, deleting entities, entity structural elements, and data in the external component 302 via the adapter component 306, and the like.

Indeed, by employing the adapter component 306 described herein, the computing device 24 may avoid pulling or extracting data directly from other connected client devices to the external platform using either manual processes or manual file XML (Extensible Markup Language) exports and imports that may be used for creating entity structures, updating entity structures, and deleting entity structures within the external platform. Instead, by performing the embodiments disclosed herein using the adapter component 306, the computing device 24 may access multiple data sources that operate according to different programming languages using the same native functions of the computing device 24, such that the collected data may be directly provided to the external component 302 in a format that the external component 302 may be able to interpret and use.

Since the adapter component 306 may enable the common gateway platform (e.g., the information gateway, gateway, edge computing device) to interact with the external component 302, the computing device 24 may provide functionalities of the external component 302 as native functions of the computing device 24. That is, the adapter component 306 may provide functions to connect, create, read, write, update, delete, run commands and queries, and disconnect from the external component 302 using native commands and actions interpretable by the computing device 24. As a result, the ability of the computing device 24 to understand and engage with various types of components using various programming languages may be extended to the functions of the external component 302, which may not be able to interpret data received directly from various types of components.

FIG. 15 illustrates a procedure 330 for providing the structured data 310 to the external component 302. The procedure 330 may be performed by the adapter component 306 or any suitable computing device. The adapter component 306 may associate datasets 120 and/or the transaction data 122, described above with respect to FIG. 5, to datasets of the external component 302 using the API and/or SDK data 304 of the external component 302. It should be understood that the order of the procedure 330 is provided by way of example and the procedure 330 may be performed in any suitable order.

Referring now to FIG. 15, at block 332, the adapter component 306 may receive a request to stream structured data 116 to the external component 302. The request may be provided via client devices or other applications accessible to the computing device 24. As discussed above, the computing device 24 may communicatively couple the external component 302 or other devices using a Web Socket connection or other suitable communication protocols.

At block 334, the adapter component 306 may retrieve a first data model (e.g., the data model 108) associated with the structured data 116. Subsequently, at block 336, the adapter component 306 may determine the datasets 120 and/or the transaction data 122 associated with the structured data 116 based on the first data model. At block 338, the adapter component 306 may receive an indication of a second data model associated with the external component 302. In some embodiments, the adapter component 306 may determine the second data model based on the API and/or SDK data 304 of the external component 302. Accordingly, the adapter component 306 may identify the external data structure of the external component 302.

At block 340, the adapter component 306 may determine a relationship between the first data model and the second data model. The adapter component 306 may determine a representation of the data structure of the external component 302 based on the first data model and the second data model. For example, the adapter component 306 may generate a table associated with the determined relationship between the first data model and the second data model. That is, the table may indicate related variable names, related operations, related functions, related data types, and other related properties between the first data model and the second data model.

At block 342, the adapter component 306 may map the structured data 116 to respective datasets of the second data model based on the determined relationship. In one embodiment, the adapter component 306 may generate the endpoint 308 that may include the mapping of the structured data 116 to the datasets of the second data model. As such, the endpoint 308 may be configured to receive the structured data 116 and automatically convert it to the stream structured data 310. At block 344, the adapter component 306 may transmit the structured data 310 to mapped datasets of the external component according to the second data model via the endpoint 308. Accordingly, the computing device 24 may use the native data model (first data model) for streaming data in structured form to the external component 302 in accordance with the external structure of the external component 302. Moreover, similar processes may be used for providing streaming data in structured form to other external components using various data models.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A tangible, non-transitory, machine-readable medium, comprising machine-readable instructions that, when executed by a processor, cause the processor to perform actions comprising:
  receiving a request to transmit a first dataset to an external component communicatively coupled to the processor;
  determining a first data structure of the first dataset based on an information model associated with the first dataset;
  detecting a second data structure of one or more datasets associated with the external component by retrieving an application program interface (API) or a software development kit (SDK) indicative of the second data structure from the external component;

determining a relationship between the first data structure and the second data structure;

converting the first dataset into a second dataset structured according to the second data structure based on the relationship; and transmitting the second dataset to the external component.

2. The tangible, non-transitory, machine-readable medium of claim 1, wherein the machine-readable instructions that, when executed by a processor, cause the processor to determine the relationship between the first data structure and the second data structure comprises generating a table representative of one or more associations between the first data structure and the second data structure based on the API, the SDK, or both.

3. The tangible, non-transitory, machine-readable medium of claim 1, wherein the processor is configured to communicatively couple to the external component via a Web Socket.

4. The tangible, non-transitory, machine-readable medium of claim 1, wherein the machine-readable instructions, when executed by a processor, cause the processor to perform actions comprising generating an endpoint component based on the relationship, wherein the endpoint component is configured to map the first dataset to the second dataset based on the relationship.

5. The tangible, non-transitory, machine-readable medium of claim 1, wherein the machine-readable instructions that, when executed by a processor, cause the processor to determine the first data structure comprises receiving raw data from one or more control systems and associating the received raw data to the first data structure based on the information model.

6. The tangible, non-transitory, machine-readable medium of claim 1, wherein the first data structure comprises the first dataset, a plurality of components, a relationship each of between the plurality of components, one or more transaction conditions, or any combination thereof.

7. An industrial system, comprising:
a plurality of devices for performing a plurality of operations in the industrial system;
at least one processor configured to perform operations comprising:
receiving a request to transmit a first dataset to an external component communicatively coupled to the at least one processor;
determining a first data structure of the first dataset based on an information model associated with the first dataset;
detecting a second data structure of one or more datasets associated with the external component;
determining a relationship between the first data structure and the second data structure by generating a table representative of one or more associations between the first data structure and the second data structure based on an application program interface (API), a software development kit (SDK), or both;
converting the first dataset into a second dataset structured according to the second data structure based on the relationship; and
transmitting the second dataset to the external component.

8. The system of claim 7, wherein detecting the second data structure comprises retrieving the application program interface (API) or the software development kit (SDK) indicative of the second data structure from the external component.

9. The system of claim 7, wherein the at least one processor is configured to communicatively couple to the external component via a Web Socket.

10. The system of claim 7, the at least one processor is configured to perform the operations comprising generating an endpoint component based on the relationship, wherein the endpoint component is configured to map the first dataset to the second dataset based on the relationship.

11. The system of claim 7, wherein determining the first data structure comprises receiving raw data from one or more control systems and associating the received raw data to the first data structure based on the information model.

12. The system of claim 7, wherein the first data structure comprises the first dataset, a plurality of components, a relationship each of between the plurality of components, one or more transaction conditions, or any combination thereof.

13. A method, comprising:
receiving, by a computing device, a request to transmit a first dataset to an external component communicatively coupled to the computing device;
determining, by the computing device, a first data structure of the first dataset based on an information model associated with the first dataset by receiving raw data from one or more control systems and associating the received raw data to the first data structure based on the information model;
detecting, by the computing device, a second data structure of one or more datasets associated with the external component;
determining, by the computing device, a relationship between the first data structure and the second data structure;
converting, by the computing device, the first dataset into a second dataset structured according to the second data structure based on the relationship; and
transmitting, by the computing device, the second dataset to the external component.

14. The method of claim 13, wherein detecting the second data structure comprises retrieving an application program interface (API) or a software development kit (SDK) indicative of the second data structure from the external component.

15. The method of claim 14, wherein determining the relationship between the first data structure and the second data structure comprises generating a table representative of one or more associations between the first data structure and the second data structure based on the API, the SDK, or both.

16. The method of claim 13, comprising generating an endpoint component based on the relationship, wherein the endpoint component is configured to map the first dataset to the second dataset based on the relationship.

17. The method of claim 13, wherein the first data structure comprises the first dataset, a plurality of components, a relationship each of between the plurality of components, one or more transaction conditions, or any combination thereof.

* * * * *